United States Patent [19]

Nojiri et al.

[11] Patent Number: 4,530,110
[45] Date of Patent: Jul. 16, 1985

[54] CONTINUOUS SPEECH RECOGNITION METHOD AND DEVICE

[75] Inventors: Tadao Nojiri, Oobu; Hiroshige Asada, Nagoya; Nobuyuki Teraura, Tokai, all of Japan

[73] Assignee: Nippondenso Co., Ltd., Kariya, Japan

[21] Appl. No.: 427,539

[22] Filed: Sep. 29, 1982

[30] Foreign Application Priority Data

Nov. 18, 1981 [JP] Japan .................. 56-183635

[51] Int. Cl.³ .............................................. G10L 1/00
[52] U.S. Cl. ..................................... 381/43; 364/513.5
[58] Field of Search .......................... 381/41–43; 364/513.5; 382/33, 34, 37

[56] References Cited

U.S. PATENT DOCUMENTS 4,059,725 11/1977 Sakoe ................................ 381/43
4,384,273 5/1983 Ackland et al. ................... 381/43

OTHER PUBLICATIONS

IEEE Transactions on Myers et al., "Acoustics, Speech, and Signal Processing", pp. 284–297, vol. ASSP-29, No. 2, Apr. 1981.

Primary Examiner—E. S. Matt Kemeny
Attorney, Agent, or Firm—Cushman, Darby & Cushman

[57] ABSTRACT

In a system for recognizing a continuous speech pattern, based on a speech pattern entered through a microphone, a feature vector $\alpha_i$ is extracted by a feature extraction unit, and a feature vector $\beta_j{}^n$ is read out from a reference pattern memory. A first recursive operation unit ($DPM_1$) computes a set of similarity measures $S_n(i, j)$ between the feature vectors. A maximum similarity measure at a time point i is determined and produced by a first decision unit ($DSC_1$) and is stored in a maximum similarity memory (MAX). A second recursive operation unit ($DMP_2$) computes a reversed similarity measure. Based on a computed result $g(v, 1)$ and the output from said maximum similarity measure memory, a second decision unit determines a boundary $v_{max}$. A word $W_u$ based on data $u = v_{max} - 1$ obtained by the boundary v is stored as $n_x(x = 1, \ldots, Y)$ in an order reversing unit (REV). The order reversing unit finally reverses the order of data and produces an output $n_x(x = 1, \ldots, Y)$.

10 Claims, 19 Drawing Figures

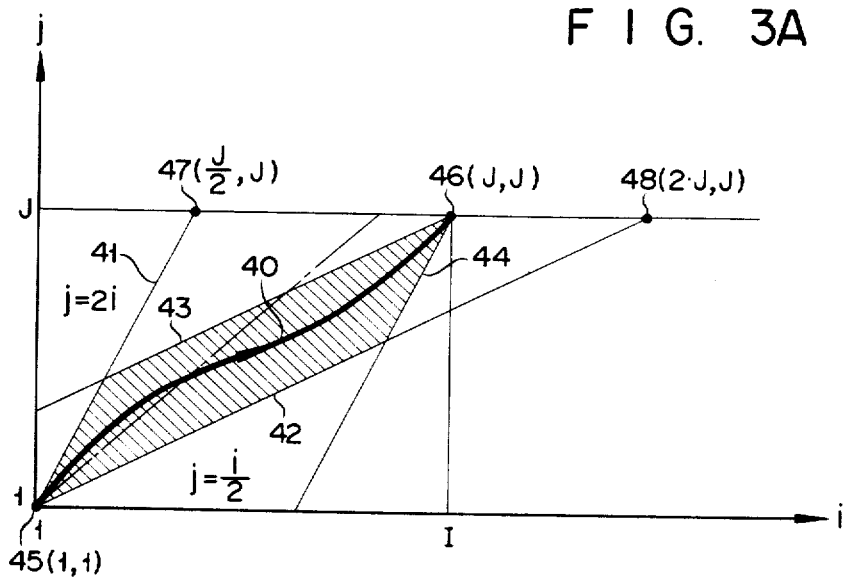
F I G. 3A
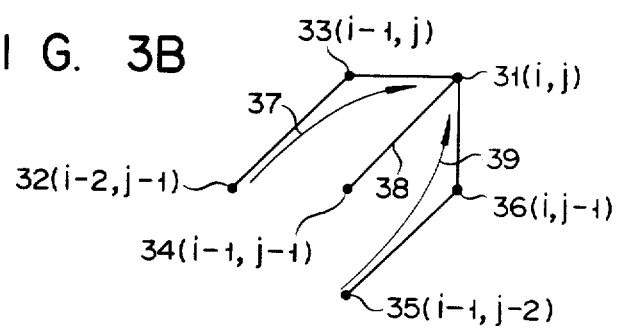
F I G. 3B
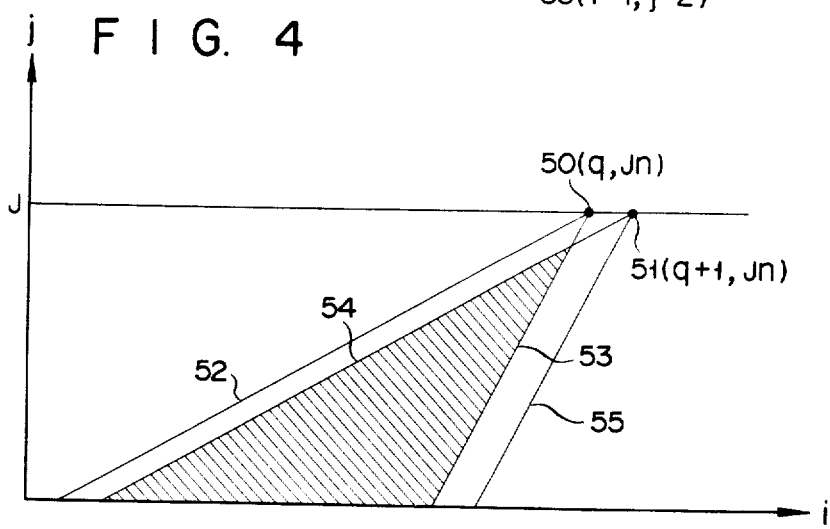
F I G. 4

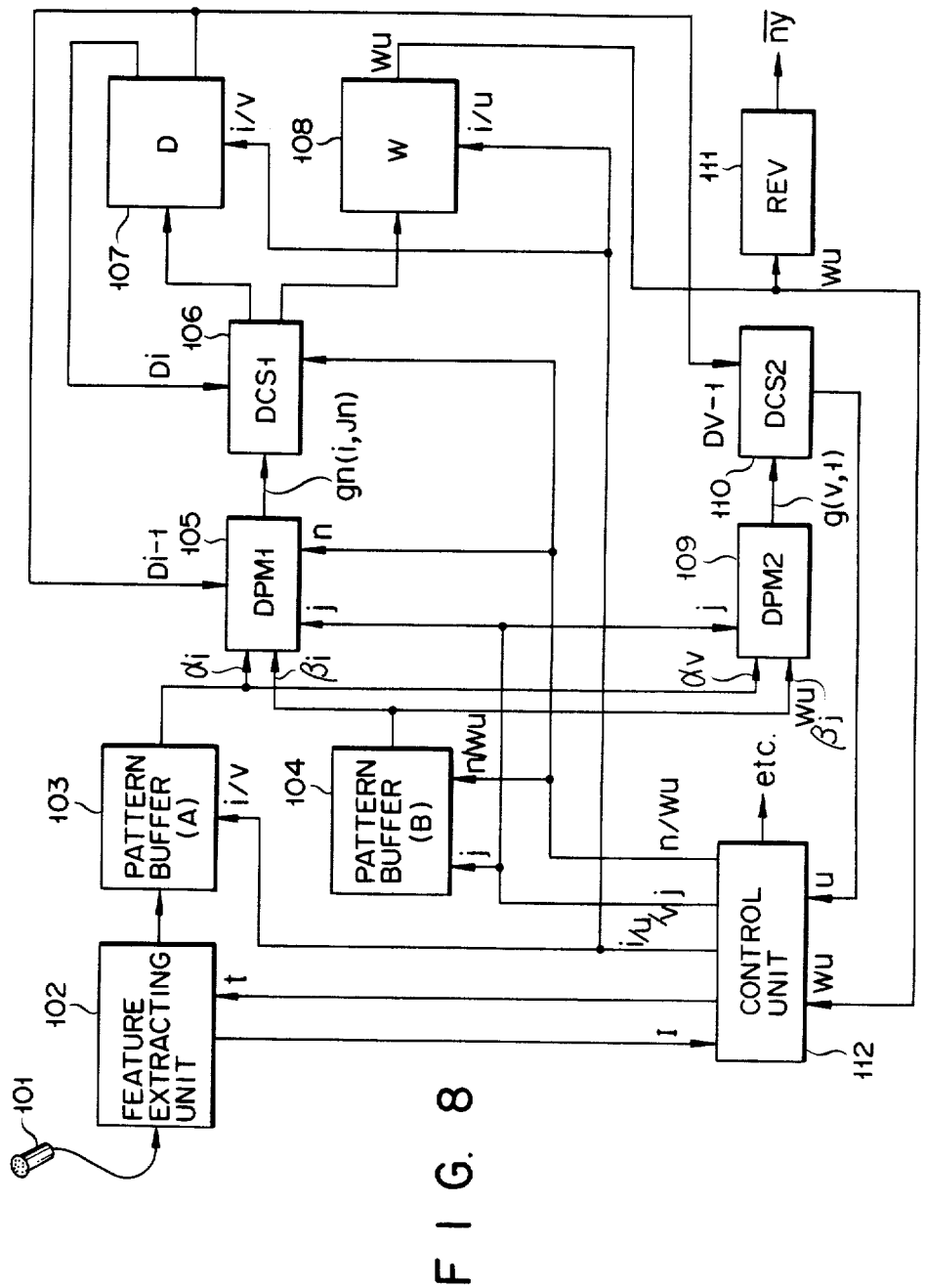
F I G. 8

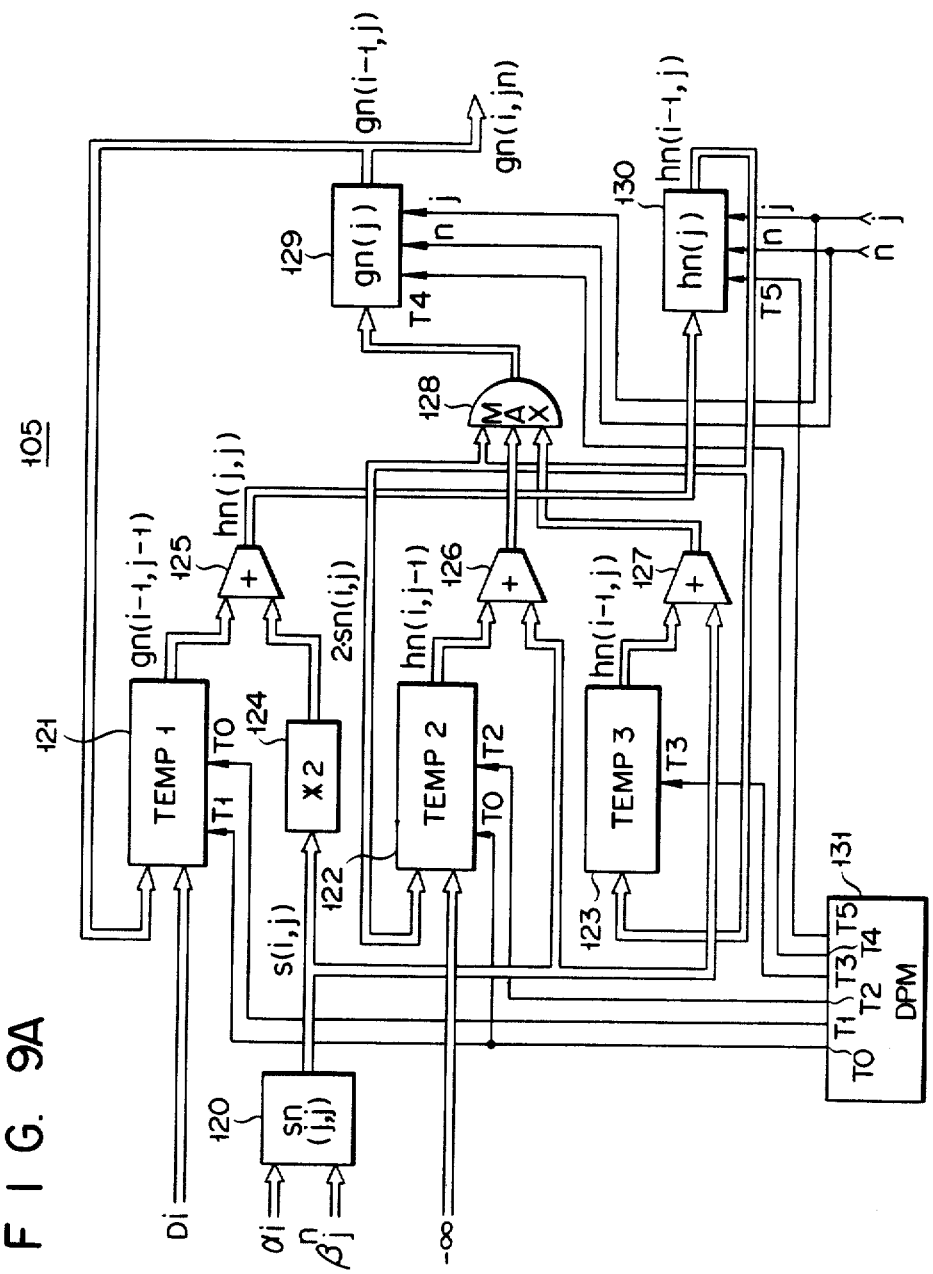
F I G. 9A

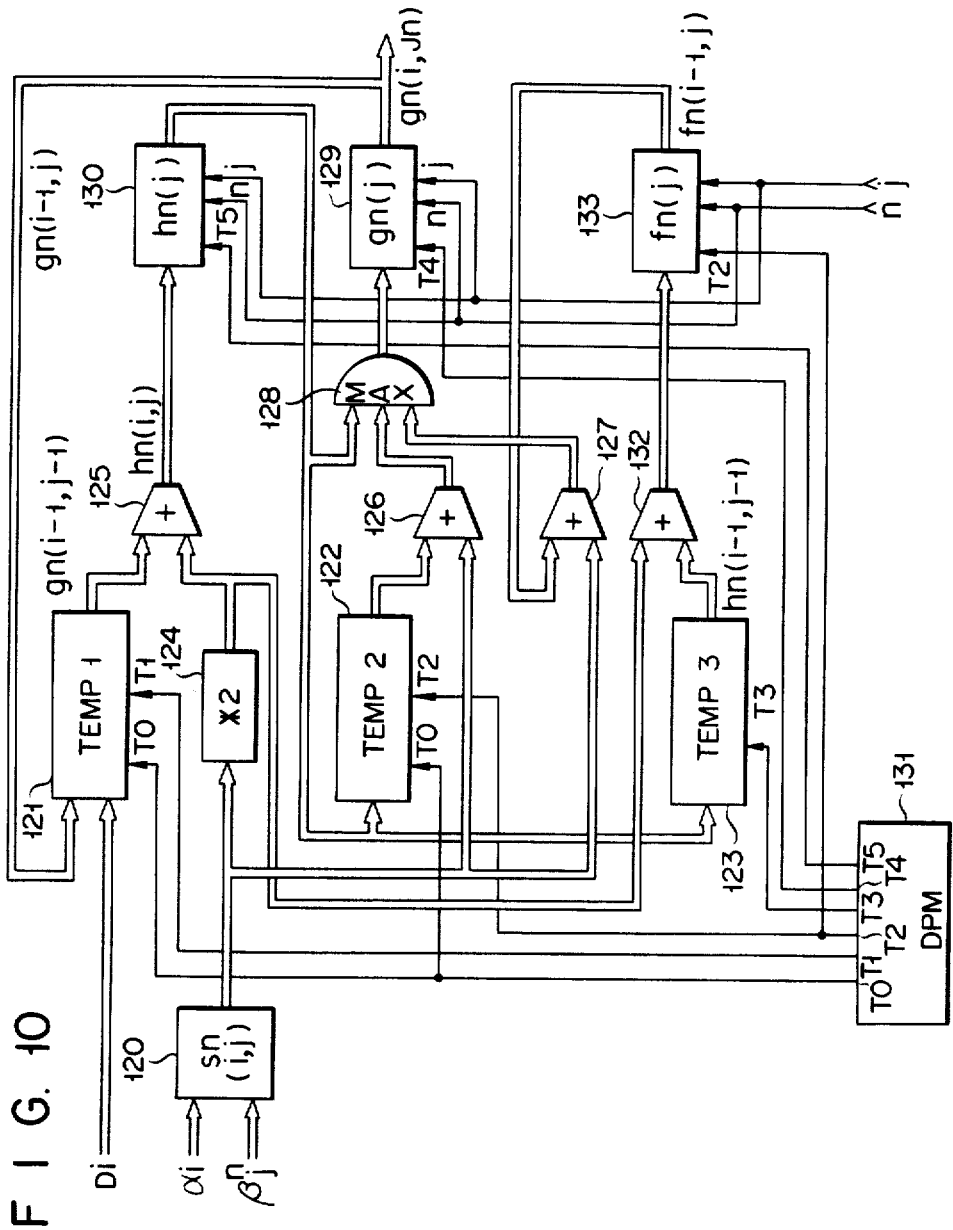
F I G. 10

CONTINUOUS SPEECH RECOGNITION METHOD AND DEVICE

BACKGROUND OF THE INVENTION

The present invention relates to a continuous speech recognition method and device for automatically recognizing a plurality of concatenated words such as numericals and for producing an output in accordance with the recognized content.

Speech recognition devices have been considered to be effective means for performing man/machine communication. However, most of the devices which have been developed so far have a disadvantage in that only isolated or discrete words can be recognized, so that data input speed is very low. In order to solve the above problem, a continuous speech pattern device which uses a two-level dynamic programming (to be referred to as a two-level DP) algorithm is described in Japanese Patent Disclosure No. 51-104204. In the principle of this algorithm, pattern strings obtained by concatenating several reference patterns in all possible orders are defined as reference pattern strings of a continuous speech. An input pattern as a whole is mapped onto the reference pattern strings. The number of reference patterns and their arrangement are determined to maximize the overall similarity measure between the input pattern and the reference pattern strings. Thus, speech recognition is performed. In practice, maximization is achieved by two stages of maximization; of individual words and of word strings. These maximization can be performed utilizing the DP algorithm.

The two-level DP algorithm will be described in detail below. Let feature vectors $a_i$ be $$(a_{1i}, a_{2i}, \ldots, a_{Qi}) \tag{1}$$

then, a speech pattern A is defined as a time series of $a_i$:

$$A = (a_1, a_2, a_3, \ldots, a_i, \ldots, a_I) \tag{2}$$

where I is the duration of the speech pattern A, and Q is the number of components of the feature vectors. Thus, the speech pattern A is regarded as the input pattern.

Assume that N reference patterns $B^n (n=1, 2, \ldots, N)$ are defined as a set of words to be recognized. Each reference pattern $B^n$ has $J_n$ feature vectors as follows:

$$B^n = (\beta_1^n, \beta_2^n, \ldots, \beta_j^n, \ldots, \beta_{J_n}^n) \tag{3}$$

where the feature vector $\beta_j^n$ is a similar vector to the feature vector $a_i$, as follows:

$$\beta_j^n = (b_{1j}^n, b_{2j}^n b_{Qj}^n) \tag{4}$$

The partial pattern of the input pattern A which has a starting point l and an endpoint m on the time base i can be expressed as follows:

$$A_{(l, m)} = (a_l, a_{l+1}, \ldots, a_i, \ldots, a_m) \tag{5}$$

for $1 \leq l < m \leq I$

Between the partial pattern $A_{(l, m)}$ and the reference pattern $B^n$, a function j(i) which establishes a correspondence between a time base i of the input pattern and a time base j of the reference pattern is optimally determined. Partial matching is performed wherein a maximum value $S(A_{(l, m)}, B^n)$ of the sum of similarity measures $s(a_i, \beta_j^n)$ (to be referred to as $s_n$ (i, j)) between vectors which are defined by i and j(i) is computed by the DP algorithm. In the first stage, a partial similarity measure $S<l, m>$ as the maximum value of $S(A_{(l, m)}, B^n)$ is determined for n which is computed by sequentially changing the starting point l and the endpoint m, and a partial determination result $n<l, m>$ for providing the maximum value is also determined. Overall matching is performed at the second stage wherein the number Y of words included in the input pattern and boundaries $l_{(1)}, l_{(2)}, \ldots, l_{(Y-1)}$ which number (Y-1) are optimally determined, and wherein the number Y of words and boundaries $l_{(1)}, l_{(2)} l_{(Y-1)}$ are obtained to maximize the sum of the partial similarity measures during continuous and nonoverlapping duration. The sum is given by the following relation:

$$S<1, I> = S<1, l_{(1)}> + S<l_{(1)} + 1, l_{(2)}> + S<l_{(Y-1)} + 1, I> \tag{6}$$

The boundaries $l_{(1)}, l_{(2)}, \ldots, l_{(Y-1)}$ and the partial determination result $n<l, m>$ determine $n<1, l_{(1)}>$, $n<l_{(1)}+1, l_{(2)}>, \ldots, n\, l_{Y-1)} + 1, I>$ The definition of the similarity measure is given by a function which maps the time base j of a reference pattern B and the time base i of the input pattern A in order to correct deviation between the time bases of the input pattern A given by relation (2) and the reference pattern B given by relation (3) as follows:

$$j = j(i) \tag{7}$$

Assume that the similarity measure s(i, j) is exemplified by the following relation:

$$s(i, j) = \sum_{p=1}^{Q} (a_{pi} \times b_{pj})/(a_{pi}^2 + b_{pj}^2) \tag{8}$$

The similarity measure between the input pattern A and the reference pattern B is given as follows:

$$S(A, B) = \underset{j(i)}{MAX} \left[ \sum_{i=1}^{I} s(i, j(i)) \right] \tag{9}$$

It is impossible to obtain a maximum value of relation (9) by computing all the possibilities for $j = j(i)$. Instead, the DP algorithm is utilized as follows. Let the initial conditions be:

$$\left. \begin{array}{l} g(1, 1) = s(1, 1) \\ g(i, 1) = 0 \text{ for } (i \neq 1) \end{array} \right\} \tag{10}$$

g(I,J) is computed in a range of i=2 to I and j=1 to J by the following recursive relation:

$$g(i, j) = s(i, j) + MAX \begin{pmatrix} g(i-1, j) \\ g(i-1, j-2) \\ g(i-1, j-2) \end{pmatrix} \tag{11}$$

Therefore, S(A, B) of relation (9) is given by:

$$S(A, B) = g(I, J) \tag{12}$$

The deviation of the time base in practice may not exceed 50% in practice, so that a hatched region bounded by lines 11 and 12 and a line 15 indicated by "i=j" in FIG. 1 need only be considered. Therefore, recursive relation (11) need only be applied in the range:

$$j - r \leq i \leq j + r \tag{13}$$

The above hatched region is called an adjustment window.

The partial similarity measure of the endpoint m in the range indicated by reference numeral 14 in FIG. 1 is obtained in correspondence with one starting point l. The hatched region in FIG. 1 is defined by all the computations "$(2 \ast r + 1) \ast J_n$" for one starting point.

When relation (13) is used as a condition for the alignment range of time bases i and j, the total computation $C_1$ by the DP algorithm for the similarity measure s(i, j) is approximated as follows, even if only the partial similarity measure "S<l, m>" is to be obtained in the first stage:

$$C_1 = (2 \ast r + 1) \ast J \ast 1 \ast N \tag{14}$$

where I is the duration of the input pattern, N is the number of reference patterns, and J is the average duration of the reference patterns. For the second stage, data of the partial similarity measure "S<l, m>" and the partial determination result "n<l, m>" must be stored. The storage capacity $M_1$ is obtained by the following approximation:

$$M_1 = (2 \ast r + 1) \ast I \ast 2 \tag{15}$$

If the following conditions are given:

$$I = 120, N = 50, J = 35 \text{ and } r = 12 \tag{16}$$

when $$\left. \begin{array}{l} \text{Total Computation: } C_1 = 5{,}250{,}000 \\ \text{Storage Capacity: } M_1 = 6{,}000 \end{array} \right\} \tag{17}$$

In order to manufacture a real time speech recognition device which provides a recognition result within 0.5 seconds after an utterance is completed, a total of "5,250,000" computations must be completed within 2.3 seconds (=0.5 + 120×0.015), provided that the durations I and J are respectively 15 msec and the full duration from the utterance to the response is used for computation. Thus, high speed computation of about 0.4 μsec for each computation is required. Even if parallel processing is performed, a large scale device is needed, resulting in high cost.

SUMMARY OF THE INVENTION

It is, therefore, an object of the present invention to provide a continuous speech recognition device which performs real time speech recognition and pattern matching even in a low-speed processor and which is small in size and low in cost.

It is another object of the present invention to provide a continuous speech recognition device which requires about half of the conventional storage capacity when total number of computations corresponds to "$J \ast N \ast I$".

Assume that the reference pattern string B has concatenated Y reference patterns $B^{n1}, B^{n2}, \ldots, B^{nx-1}, \ldots, B^{ny}$. The reference pattern string B is given as follows:

$$B = B^{n1} \oplus B^{n2} \oplus \ldots \oplus B^{nx-1} \oplus B^{nx} \oplus B^{ny} \tag{18}$$

Symbol $\oplus$ denotes that features vectors of each reference pattern are ordered in accordance with the time sequence. Therefore, $$B = (\beta_1^{n1}, \beta_2^{n1}, \ldots, \beta_{jn1}^{n1}, \beta_1^{n2}, \beta_2^{n2}, \ldots, \tag{19}$$

$$\beta_{jn2}^{n2}, \ldots, \beta_1^{nx-1}, \beta_2^{nx-1}, \ldots, \beta_{jnx-1}^{nx-1}, \beta_1^{nx},$$

$$\beta_2^{nx}, \ldots, \beta_{jnx}^{nx}, \ldots, \beta_1^{ny}, \beta_2^{ny}, \ldots, \beta_{jny}^{ny})$$

According to the principle of the present invention, the reference pattern string B given by relation (18) is optimally matched with the input pattern A given by relation (2), in the same manner as in the conventional two-level DP algorithm, to determine the words n "$n_1, n_2, n_{x-1}, n_x, \ldots, n_y$" for optimal matching. Therefore, the input pattern A is determined to comprise words "$n_1, n_2, \ldots, n_{x-1}, n_x, \ldots, n_y$". In this case, the number Y of words is also optimally determined.

The concatenated words of the input pattern A are recognized by determining the number of reference patterns with maximum similarities and the types of words.

BRIEF DESCRIPTION OF THE DRAWINGS

FIG. 3A graphically illustrates a computation range of a recursive relation with a slope constraint when a starting point and an endpoint are fixed;

FIG. 3B is a view of an example of the computation range of the recursive relation with a slope constraint;

FIG. 4 is a graph for explaining a decrease in total computation of continuous speech recognition according to the present invention;

FIG. 5A is a graph for explaining the details of the first step;

FIG. 8 is a block diagram of a continuous speech recognition device according to a first embodiment of the present invention;

FIG. 9A is a block diagram of a first recursive computation section (DPM$_1$) of the device shown in FIG. 8;

FIG. 10 is a block diagram of another example of a DPM$_1$;

DETAILED DESCRIPTION OF THE PREFERRED EMBODIMENTS

I. General Description

Figure 1:
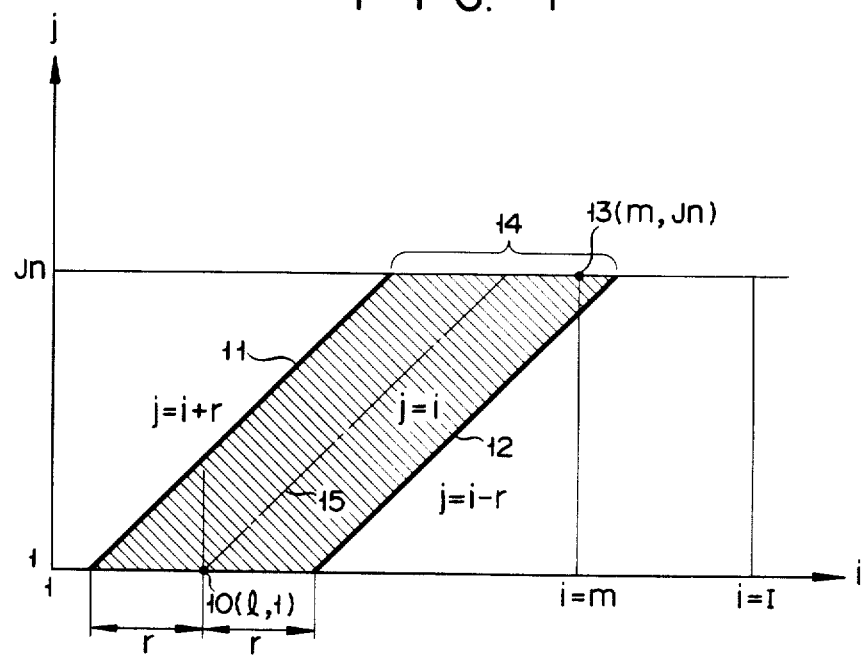
FIG. 1 graphically illustrates a computation range of a two-level DP algorithm as a conventional continuous speech recognition means.

In order to fully understand the present invention, the speech recognition algorithm of the present invention is compared with a two-level DP algorithm.

The two-level DP algorithm comprises first-stage matching in which the partial similarity measure is computed by all possible combinations of the starting points and the endpoints to determine the partial determination results, and second-stage matching in which a boundary is determined for providing the maximum overall similarity measure by utilizing dynamic programming of all possible combinations of the partial determination results. According to the present invention, however, the overall similarity measure is not maximized at the second stage. The maximum overall similarity measure is obtained at the first-stage matching in the following manner. Assume that the time point "$i=p$" ($1 \leq p \leq I$) of the input pattern A is defined as the boundary between two words, and that a maximum similarity measure "$D_p = S < 1, p >$" is obtained from an optimum combination of the reference words and a partial pattern "$A(1, p)$" of the input pattern A. The maximum similarity measure $D_q$ between a partial pattern "$A(1, q)$ of the input pattern A whose endpoint is a time point "$i=q$"($1 \leq p < q \leq I$) and the optimum combination of the reference words is given as follows:

$$D_q = S < 1, q > = \underset{n,p}{\text{MAX}}\{D_p + S(A_{(p+1,q)}, B^n)\} \quad (20)$$

In this case, n is stored as $W_q$, where $$W_q = [n \text{ for } D_q \text{ of relation (20)}] \quad (21)$$

"$S(A_{(p+1, q)}, B^n)$" indicates the similarity measure between a partial pattern "$A_{(p+1, q)}$" with the endpoint q and the reference pattern $B^n$ of the word n. This computation is the same as that of the partial similarity measure of the two-level DP algorithm. According to the present invention, however, the partial similarity pressure is not independently obtained, but is obtained in the braces of the right-hand side of relation (20). In relations (20) and (21), when the condition "$D_0 = 0$" is given $D_q$ and $W_q$ are obtained for $1 \leq q \leq I$ since the maximum similarity measure "$D_p$ ($p<q$) is given. The maximum overall similarity measure "$S < 1, I >$ is obtained as $D_I$. Thus, the first step of continuous speech recognition is completed. Thereafter, the second step is performed in which the number Y of words which constitute a permutation/combination "$B = B^{n_1} \oplus B^{n_2} \oplus \ldots \oplus B^{n_Y}$" and their words "$n_1, n_2, \ldots, n_Y$" are determined. In this procedure, a final word $n_Y$ is obtained as $W_I$. However, only $D_i$ and $W_i$ are stored in order to greatly decrease the required memory capacity and total compution of the first step. For this reason, the boundaries of the words "$n_Y, n_{Y-1}, \ldots, n_2, n_1$" are backtracked beginning from the time point "$i=I$". A recognized word $W_u$ is output with the time point "$i=I$" defined as a starting point u. $D_p$ matching is performed in the reverse direction only for the recognized word $W_u$. An endpoint v is obtained which maximizes the sum of $D_{v-1}$ and a similarity measure "$S(\overline{A}_{(u, v)}, B\overline{B}^{Wu})$" obtained by a backtracking partial pattern "$\overline{A}_{(u, v)}$" from the starting point u to the endpoint v and the reversely concatenated reference pattern string $\overline{B}^{Wu}$ as follows:

$$v_{max} = \underset{v}{\text{ARGMAX}}\{D_{v-1} + S(\overline{A}_{(u,v)}, \overline{B}^{Wu})\} \quad (22)$$

where ARGMAX is the endpoint v which gives a maximum value in the braces of relation (22).

The $v_{max}$ is the starting point (endpoint in the reverse $D_p$ matching) of the word $W_u$. Let the starting point u now be defined as an endpoint (starting point in reverse $D_p$ matching of an immediately preceding word:

$$u = v_{max} - 1 \quad (23)$$

When tracking is repeated from "$u = v_{max-1}$" to "$u=0$", all the recognized words are obtained in the reverse order. The obtained reverse ordered word string is reversed again, so that the input word string is regarded as recognized.

The fundamental principle of the algorithm according to the present invention is described above. However, relation (20) cannot be computed for all p, q and n in the first step due to the amount of total computation. If maximization at the boundary p is first performed, relation (20) can be rewritten as follows:

$$D_q = \underset{n}{\text{MAX}}[\underset{p}{\text{MAX}}\{D_p + S(A_{(p+1,q)}, B^n)\}] \quad (24)$$

Terms in the brackets of relation (24) can be substituted by a conventional dynamic programming algorithm in which the starting point is free as "$(p+1)$" whose initial value is $D_p$, and the endpoint q is fixed.

Figure 2:
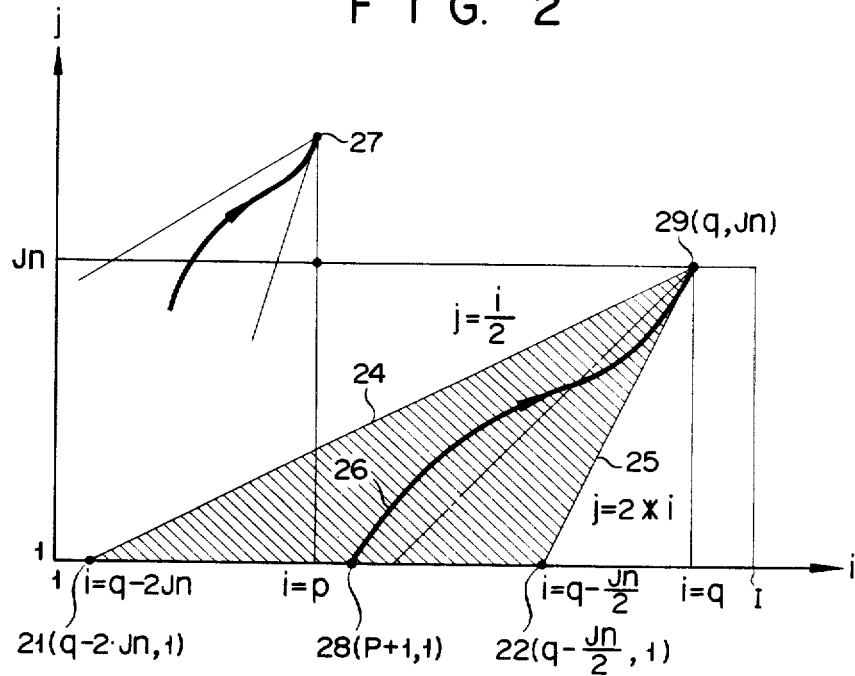
FIG. 2 is a graph for explaining a first step of continuous speech recognition according to the present invention.

The above case is described with reference to FIG. 2. If the maximum similarity measure $D_p$ in a duration having the time point "$i=p$" as the endpoint is given as the initial value, the sum of products for maximizing the sum of the similarity measure $s_n(i, j)$ of the feature vectors $\alpha_i$ and $\beta_j$ of a grid point (i, j) of a path 26 leading from a starting point 28 as (p+1, 1) to an endpoint 29 as (q, $J_n$) is obtained by the DP algorithm as "$D_p + S(A_{(p+1, q)}, B^n)$".

In the two-level DP algorithm, the adjustment window bounded by the lines 11 and 12 given by relation (12) and shown in FIG. 1 is arranged as a range of the (i, j) plane for computing the similarity measure $s_n(i, j)$ in order to eliminate wasteful computation and abrupt adjustment of the time bases. However, according to the present invention, the adjustment window is not arranged, but two slope constraints are included as the recursive relations in the DP algorithm. There are various examples of slope constraints; the following is a typical example:

Initial values:
$$\begin{aligned} g(0, 0) &= 0 \\ g(i, 0) &= -\infty \ (i \neq 0) \\ g(i, -1) &= -\infty \\ g(0, j) &= -\infty \ (j \neq 0) \end{aligned} \quad (30)$$

where $-\infty$ denotes a value computable by a given processor which has the negative sign and which has the maximum absolute value. This value is always smaller than other values to be compared with. The following recursive relation is solved for "i = 1 to I" and "j = 1 to J":

$$g(i, j) = s(i, j) + \text{MAX} \begin{pmatrix} g(i-1, j-2) + 2 \cdot s(i, j-1) \\ g(i-1, j-1) + s(i, j) \\ g(i-2, j-1) + 2 \cdot s(i-1, j) \end{pmatrix} \quad (31)$$

As shown in FIG. 3B, there are three paths from different starting points to a point 31 (i, j): a path 37 from a point 32 (i-2, j-1) to the point (i, j) via a point 33(i-1, j); a path 38 from a point 34 (i-1, j-1) to the point 31 (i, j); and a path from a point 35 (i-1, j-2) to the point 31 (i,j) via a point 36 (i, j-1). Among these three paths, the longest path is selected. In the path 37, an increment of 2 along the time base i of the input pattern corresponds to an increment of 1 along the time base j of the reference pattern, so that a slope of a segment connecting the point 34 and the point 31 is 1, while a slope of a segment connecting the point 35 and the point 21 is 2.

As shown in FIG. 3A, by utilizing recursive relation (31) for obtaining an optimal path 40 from a starting point (1, 1) to an endpoint 46 (I, J), the search range of the (i, j) plane is a triangular region which is bounded by a line 42 with a slope of ½ at minimum and a line 41 with a slope of 2 at maximum and which is defined by three points 45, 47 and 48. Since the endpoint 46 (I, J) is known, the search region is restricted by a line 43 with a slope of ½ and a line 44 with a slope of 2. As a result, the search region corresponds to the hatched region of a parallelogram bounded by the lines 41, 42, 43 and 44. Thus, the recursive relation itself has a slope constraint, so that abrupt adjustment of time bases can be prevented without arranging the adjustment window.

Dynamic programming will be described in which an endpoint is fixed, while its starting point is free. As shown in FIG. 2, since the endpoint 29 is fixed as (q, $J_n$), the similarity measures $s_n(i, j)$ is computed in a hatched region surrounded by a line 24 with a slope of ½ and a line 25 with a slope of 2 by using recursive relation (31) to find an optimal path to reach the endpoint 29.

All the points 28 (p+1,1) from a point 21 (q−2·$J_n$,1) to a point 22 (q−$J_n$/2,1) are candidates for the starting point. If the following condition is given:

$$k = q - 2 \cdot J_n \quad (32)$$

recursive relation (31) is solved from "i = k", so that $$\begin{aligned} g_n(i, 0) &= D_i \\ g_n(i, -1) &= -\infty \\ g_n(i-1, 0) &= -\infty \end{aligned} \quad (33)$$

Thus, recursive relation (31) is solved for j = 1 to $J_n$ by increasing i to q in unitary increments. The final result $g_n(g, J_n)$ of the recursive relation indicates:

$$g_n(q, J_n) = \text{MAX}_p \{D_p + S(A_{(p-1,q)}, B^n)\} \quad (34)$$

When the continuous speech recognition processing is performed by relation (20) with relations (30) to (34), and when relation (31) is computed within a range of hatched region in FIG. 2 every time the endpoint q is obtained, the overall similarity measure between vectors and the total computation $C_2$ of the recursive region are given as follows:

$$C_2 = \tfrac{3}{4} * J^2 * I * N \quad (35)$$

where J is the mean value of $J_n$. The result is substantially the same as relation (14) but is larger than that.

If a point 50 (q, $J_n$) in FIG. 4 is defined as the endpoint, total computation for the region bounded by lines 52 and 53 corresponds to $\tfrac{3}{4} \cdot J_n^2$. Even if a point 51 (q+1, $J_n$) which is next to the point 50 is defined as the endpoint, the total computation for the region bounded by lines 54 and 55 corresponds to $\tfrac{3}{4} \cdot J_n^2$. However, as may be apparent from the graph, the hatched region surrounded by the lines 54 and 53 can provide the same vector similarity measure regardless of the endpoints 50 and 51. Computation of "($\tfrac{3}{4} \cdot J_n^2$) * 2" substantially corresponds to ($\tfrac{3}{4} \cdot J_n^2 + J_n/2$). This result can be applied to every endpoint, so that the overlapped portion can be computed once. Therefore, the total computation $C_3$ is given as follows:

$$C_3 = (J*I - J^2/2) * N \quad (36)$$

The above relation indicates the inside of a parallelogram having as vertexes points 60 (1, 1), 61 ($J_n/2$, $J_n$), 62 (I, $J_n$), and 63 (I−$J_n/2$, 1). In this case, candidates for the starting point are all the points p' (1 ≦ p' ≦ I − $J_n/2$) from the point 60 (1, 1) to the point 63 (I−$J_n/2$, 1), while candidates for the endpoint are all the points q' ($J_n/2$ ≦ q' ≦ I) from the point 61 ($J_n/2$, $J_n$) to the point 62 (I, $J_n$) in this dynamic programming.

Each combination of starting point and endpoint is not independently computed. All the combinations are simultaneously computed, thus greatly decreasing the total computation. Further, even if the parallel computation is performed, abrupt alignment of time bases may not occur since the recursive relation includes a two-side slope constraint.

According to the dynamic programming as described above, recorsive relation (31) is computed for the time base j (1 to $J_n$) of each reference pattern for all words n. The computation is continued for the time base i of the input pattern.

Referring to FIG. 5A, assume that the computation of recursive relation (31) is completed when "i = p". In other words, the computation of the recursive relation for the inside region of the parallelogram having as vertexes points 60 (1, 1), 61 ($J_n/2$, $J_n$), 68 (p, $J_n$), and 65 (p, 1) is completed. Further, intermediate results of the recursive relation, such as $g_n(i, j)$ and $s_n(i, j)$ are stored. Furthermore, the following relation:

$$D_i = \text{MAX}_n \{g_n(i, J_n)\}, \quad (37)$$

is calculated for "i=1 to p". For computing the relation for "i=p+1", let the initial value for every waord be defined as $D_p$ according to relation (33), so that:

$$\left.\begin{array}{l} g_n(p, 0) = D_p \\ g_n(p - 1, 0) = -\infty \\ g_n(p, -1) = -\infty \end{array}\right\} \quad (38)$$

Therefore, the following recursive relation is computed for "j=1 to $J_n$":

$$g_n(p + 1, j) = s_n(p + 1, j) + \quad (39)$$

$$MAX \left\{ \begin{array}{l} g_n(p, j - 2) + 2s_n(p + 1, j - 1) \\ g_n(p, j - 1) + s_n(p + 1, j) \\ g_n(p - 1, j - 1) + 2s_n(p, j) \end{array} \right\}$$

Therefore, $g_n(p+1, J_n)$ is obtained for each word. Now, let the maximum value for n be $D_{p+1}$.

$$D_{p+1} = \text{MAX}_n \{g_n(p + 1, J_n)\} \quad (40)$$

Figure 5B:
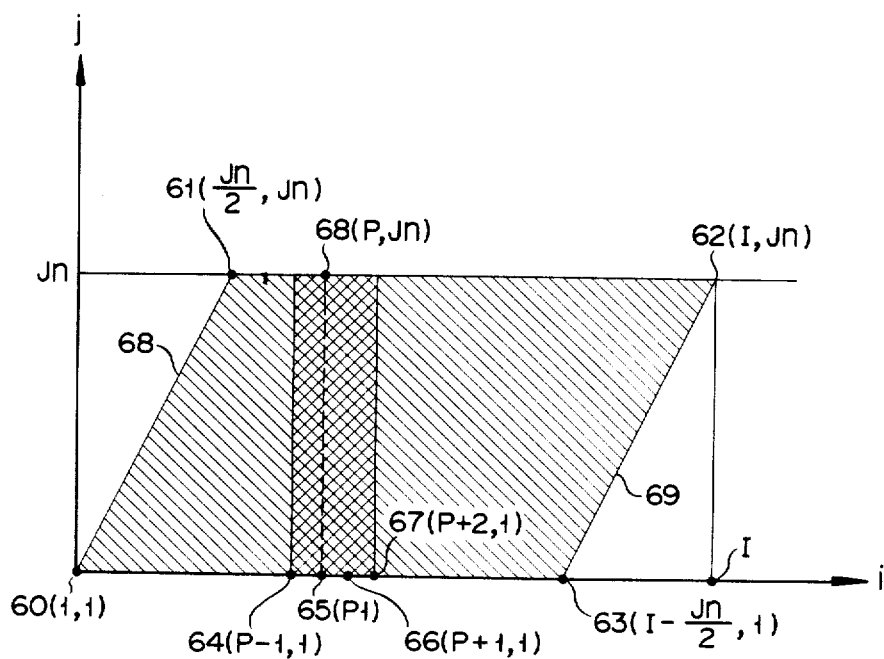
FIG. 5B is an enlarged view of the cross-hatched region in FIG. 5A.
Figure 5B:
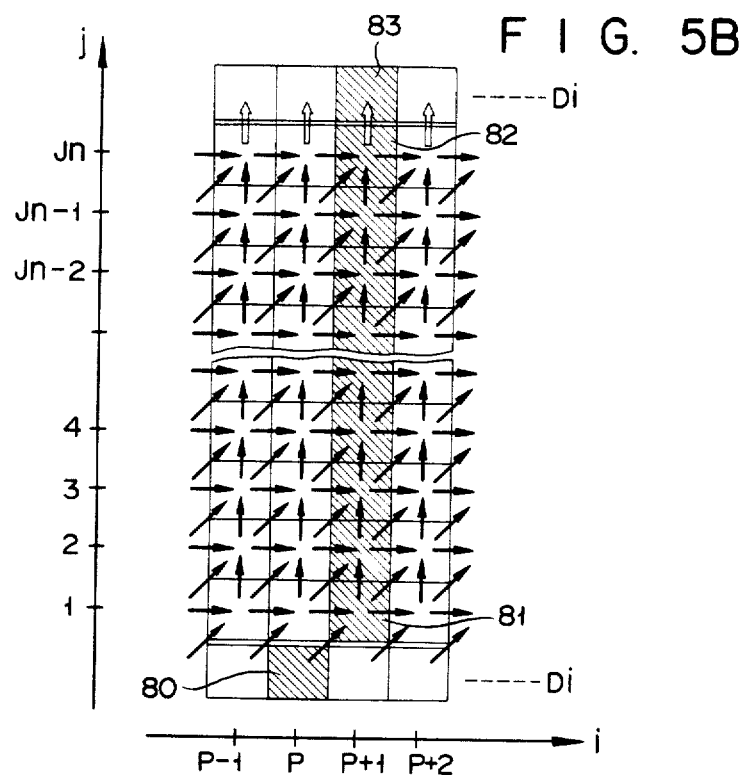

The above processing is shown in FIG. 5B. FIG. 5B is an enlarged view of the cross-hatched region in FIG. 5A. The intermediate results $D_i$ are included in the upper and lower sides, so that two strings are aligned. However, these are illustrated for descriptive convenience; these are in practice the same.

Take up the word n for an example. Since the computation is completed when "i=p" along the time axis, "$g_n(i, j)$" and "$s_n(i, j)$" at each point between $D_p$ and (i, j) in FIG. 5B are computed for "$1 \leq i \leq p$" and "$1 \leq j \leq J_n$". According to relation (38), $$\left.\begin{array}{l} g_n(p, 0) = D_p \\ g_n(p - 1, 0) = -\infty \\ g_n(p, -1) = -\infty \end{array}\right\} \quad (41)$$

Therefore, if "j=1" is given, the recursive relation at the point (p+1,1) is given as follows:

$$g_n(p + 1, 1) = s_n(p + 1, 1) + MAX \left\{ \begin{array}{l} -\infty \\ D_p \\ -\infty \end{array} \right\} \quad (42)$$

$$= s_n(p + 1, 1) + D_p \quad (43)$$

Similarly, if "j=2" is given, the recursive relation at the point (p+1, 2) is given as follows:

$$g_n(p + 1, 2) = s_n(p + 1, 2) + \quad (44)$$

$$MAX \left\{ \begin{array}{l} D_p + 2s_n(p + 1, 1) \\ g_n(p, 1) + s_n(p + 1, 2) \\ g_n(p - 1, 1) + 2s_n(P, 2) \end{array} \right\}$$

Furthermore, if "j=$J_n$" is given, the recursive relation at the point (p+1, $J_n$) is given as follows:

$$g_n(p + 1, J_n) = s_n(p + 1, J_n) + \quad (45)$$

$$MAX \left\{ \begin{array}{l} g_n(p, J_n - 2) + 2s_n(p + 1, J_n - 1) \\ g_n(p, J_n - 1) + s_n(p + 1, J_n) \\ g_n(p - 1, J_n - 1) + 2s_n(p, J_n) \end{array} \right\}$$

The above computation is performed for all the reference patterns, which number N. Among the obtained results "$g_1(p+1, J_1)$, $g_2(p+1, J_2)$, . . . , $g_n(p+1, J_n)$, . . ., $g_N(p+1, J_N)$", the maximum result $D_{p+1}$ is defined as follows:

$$D_{P+1} = \text{MAX}\{g_1(p + 1, J_1), g_2(p + 1, J_2), \ldots, g_n(p + 1, J_N)\} \quad (46)$$

In the above description, for each i, the total number of computations is "$J*N$", so that the total computation $C_3$ substantially numbers "$I*J*N$". Further, snce a memory area $M_3$ must store all "$g_n(i, j)$" and "$s_n(i, j)$", it is defined as follows:

$$M_3 = I * (J + 1) * N * 2 + 2 * I \quad (47)$$

The memory area $M_3$ is very large as indicated by relation (47). However, only "g(i−1), j)", "g(i−2, j)", "s(i−1, j)", "s(i, j)" and "g(i, j)" are required to compute the ith-step recursive relation, so that a memory area $M'_3$ is given in practice as follows:

$$M'_3 = 5 * (J + 1) * N * 2 + 2 * I \quad (48)$$

Relation (48) can be rewritten for further convenience. Let "h(i, j)" be defined as follows:

$$h(i, j) = g(i - 1, j - 1) + 2s(i, j) \quad (49)$$

Thus, recursive relation (31) can be rewritten as follows:

$$g(i, j) = s(i, j) + MAX \left\{ \begin{array}{l} h(i, j-1) \\ g(i-1, j-1) + s(i, j) \\ h(i-1, j) \end{array} \right\} \quad (50)$$

or $$g(i, j) = MAX \left\{ \begin{array}{l} h(i, j-1) + s(i, j) \\ h(i, j) \\ h(i-1, j) + s(i, j) \end{array} \right\} \quad (51)$$

Figure 6:
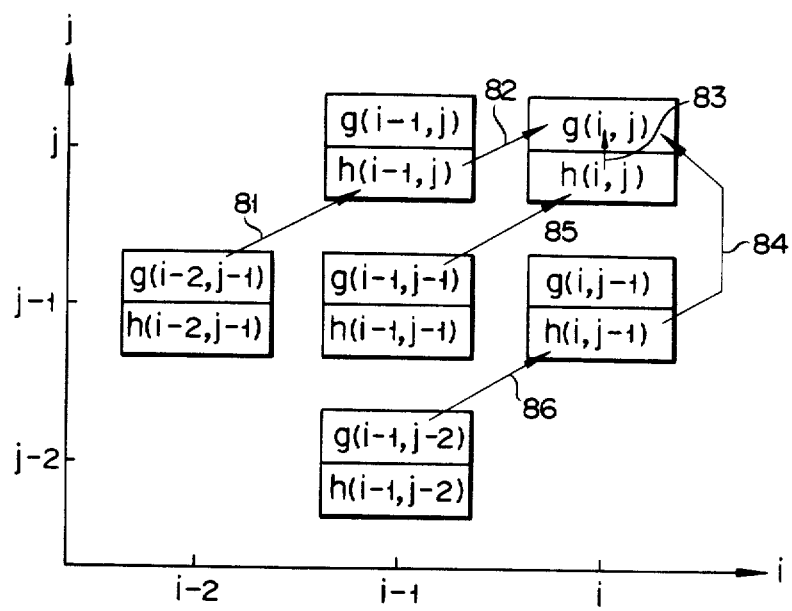
FIG. 6 is a graph for explaining the detailed computation of the recursive relation.

Referring to FIG. 6, "h(i, j)" at the point (i, j) is defined by relatin (49) and is a sum of "g(i−1, j−1)" and 2×"s(i, j)" as indicated by an arrow 85.

The first element of the maximum value of relation (31) is "{g(i−1, j−2)+2·s(i, j−1)}" as indicated by an arrow 86. However, according to the definition given by relation (49), the first element becomes "h(i, j−1)". The third element of the maximum value of relatin (31) is "{g(i−2, j−1)+2·s(i−1, j)}, as indicated by an arrow 81, but becomes "h(i−1, j). Thus, relation (51) selects the maximum value among "{h(i, j−1)+s(i, j)} indicated by an arrow 84, "h(i, j)" indicated by an arrow 83, and "{h(i−1, j)+s(i, j)}" indicated by arrow 82.

According to relations (49) and (51), the used memory areas are of three types: "h(i−1, j)", "g(i, j)" and "h(i, j)" for j=1 to $J_n$. If temporary memory registers TEMP1, TEMP2 and TEMP3 are used, relations (49) and (51) can be interpreted as follows:

Using "TEMP1 = g(0)", "TEMP2 = h(0)" and (a)
the initial value, repeat steps (b) to (f)
for "j = 1 to $J_n$".
TEMP3 = h(j) (b)
h(j) = TEMP1 + 2 * s(i, j) (c)
TEMP1 = g(i) (d)

(e)
$$g(j) = MAX \begin{cases} TEMP2 + s(i, j) \\ h(j) \\ TEMP3 + s(i, j) \end{cases}$$

TEMP2 = h(j) (f)

where h(j) is a substitute for h(i−1, j) and h(i, j), and g(j) is the same as g(i, j).

As is apparent from the above description, used memory areas $M''_3$ are of two types: h(j) and g(j). Therefore, $$M''_3 = 2*(J+1)*N + 2*I \quad (52)$$

The memory area $M''_3$ of the algorithm according to the present invention is smaller than the memory area (relation (15)) of the two-level DP algorithm.

The detailed procedures of the first step or step 1 until $D_i$ and $W_i$ tables are prepared are as follows:

(Step 1—1)

Clear the $D_i$ table for "i = 1 to I" by "= ∞" so that "$D_0 = 0$" is obtained. The complete working area of each word is defined as "− ∞".

Let $g_n(j)$ and $h_n(j)$ be "− ∞", for n = 1 to N, j = 1 to $J_n$ and i = 1.

(Step 1-2)

Let the word n be 1.

Step 1-3

Let TEMP1 be $D_{i-1}(=g_n(0))$ and TEMP2 be $-∞(=h_n(0))$.

(Step 1-4)

Repeat step 1-5 for j = 1 to $J_n$.

(Step 1-5)

Let TEMP3 be $h_n(j)$. Perform the following operations:

$h_n(j) = TEMP1 + 2 * s_n(i, j)$
$TEMP1 = g_n(j)$ $$g_n(j) = MAX \begin{cases} TEMP2 + s_n(i, j) \\ h_n(j) \\ TEMP3 + s_n(i, j) \text{ and} \end{cases}$$

$TEMP2 = h_n(j)$.

(Step 1-6)

If $g_n(J_N)$ is smaller the $D_i$, go to step 1-7. If not, let $D_i$ be $g_n(J_N)$ and $W_i$ be n.

(Step 1-7)

Let n be n + 1. If n is equal to or smaller than N, go to step (1-3).

(Step 1-8)

Let i be i + 1. If i is equal to or smaller the I, go to step (1-2).

Thus, all the intermediate results $D_i$ and $W_i$ are obtained by steps 1—1 to 1-8. Note that TEMP1, TEMP2 and TEMP3 are temporary memory registers and that $s_n(i, j)$ is the similarity measure between the input vector $\alpha_i$ and the reference vector $\beta_j^n$ of the nth word. It should also be noted the $g_n(j)$ and $h_n(j)$ are memory sections for storing intermediate results of the recursive relation for each word having a length ($J_N$).

If the similarity computation of step 1-5 and the recursive computation are performed without being limited by lines 68 and 69 shown in FIG. 5A, the total number of computations is given by the following relation:

$$C_4 = J*I*N \quad (53)$$

Therefore, a memory area $M_4$ required for the total computation is given as follows:

$$M_4 = 2*J*N + 2*I \quad (54)$$

If the result obtained by relation (16) is substituted into relation (54), $$\left. \begin{array}{l} C_4 = 210000 \\ M_4 = 3740 \end{array} \right\} \quad (55)$$

The total computation of the algorithm according to the present invention is 1/25 that of the two-level DP algorithm, and the memory area is about ½ thereof.

The second step of the algorithm according to the present invention will now be described. The intermediate results $D_i$ and $W_i$ are obtained in a range of $1 \leq i \leq I$ in the first step. The overall maximum similarity measure $D_I$ is given by the reference pattern string $B^n$ whose permutation/combination B is given as follows:

$$B = B^{n1} \oplus B^{n2} \oplus \ldots \oplus B^{nY-1} \oplus B^{nY} \quad (60)$$

The last word $n_y$ of relation (60) is $W_I$. If the boundary between the word $n_y$ and a word $n_{y-1}$ immediately before the word $n_y$ is determined, the word immediately preceding the word $n_{y-1}$ is readily determined from $W_i$. If this process is repeated up to the starting point "i = 1" of the input pattern, the concatenated input word pattern "$n_1, n_2, \ldots, n_{y-1}, n_y$" is obtained in the reverse order.

Figure 7:
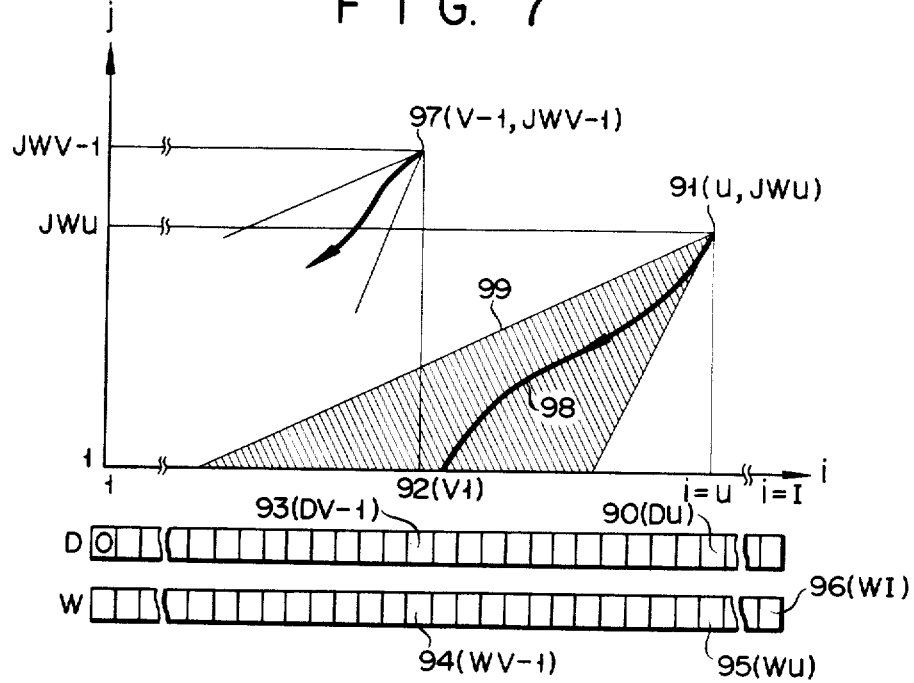
FIG. 7 is a graph for explaining a second step of continuous speech recognition according to the present invention.

The above operation is described with reference to FIG. 7. Backtracking is performed from the endpoint as indicated by "i = I" of the input pattern to the word $W_I$ indicated by reference numeral 96. Assume that the boundary between the xth word of the word string and the (x−1)th word thereof is known, and that the endpoint (starting point in the reversed dynamic programing matching) of the (x−1)th word is defined as "i = u". The (x−1)th word becomes $W_u$ indicated by reference numeral 95. The partial similarity measure $S(\overline{A}_{(u, v)}, \overline{B}^{Wu})$ is computed between the reference pattern $\overline{B}^{Wu}$ which is obtained by reverse ordering the reference pattern $B^{Wu}$ of the word $W_u$ in the opposite direction of "j = $J_{Wu}$ to 1" and the reversed partial input pattern $\overline{A}(u, v)$ which is backtracked from the starting point u to the endpoint v. The partial similarity is calculated by the dynamic programming as with relation (31) above. In practice, backtracking is performed starting from a point 91 (u, $J_{Wu}$) to a point 92 (v, 1) in a region 99 to search for a path with a maximum value. The sum of the similarity measure $S(\overline{A}_{(u, v)}, \overline{B}^{W_u})$ obtained upon search of the above-mentioned path and a $D_{v-1}$ indicated by reference numeral 93 is maximized. That is:

$$\underset{v}{MAX}\{D_{v-1} + S\,(\overline{A}_{(u, v)}, \overline{B}^{W_u})\} \tag{61}$$

The endpoint v which maximizes the value computed in expression (61) is obtained within the region 99 for all possible endpoints (v, 1). The obtained v is defined as $v_{max}$. The $v_{max}$ is regarded as the boundary of the $(x-1)$th word and the $(x-2)$th word. Let u be $(v_{max}-1)$:

$$u = v_{max} - 1 \tag{62}$$

Relations (61) and (62) are repeatedly computed until "u=0". The recognized words $W_u$ are sequentially obtained in the reverse order. The "p", "q" and "n" in the brackets of relation (24) are substituted by "v−1", "u" and "$W_u$" in relation (61). That is:

$$\left.\begin{array}{l} p = v - 1 \\ q = u \\ n = W_u \end{array}\right\} \tag{63}$$

Further, since the word n for maximizing relation (24) is determined as $W_u$, the result obtained by relation (61) is the same as $D_u$ indicated by reference numeral 90.

In practice, when the type (e.g., symmetry) of recursive relation and computation errors of the speech recognition device are considered, the value obtained by relation (61) may not be the same as $D_u$. Therefore, the maximum value is first computed, and then v for giving the maximum value is determined to be the boundary.

The detailed procedures of the second step or step 2 will now be described below:

(Step 2-1)

Let u and x be I and 1, respectively.

(Step 2—2)

Produce $W^u$ as the recognized word $n_x$.

(Step 2-3)

Initalize the working area of dynamic programming as follows:

$$g(j) = \begin{cases} 0 \ (j = J_n + 1) \\ -\infty \ (j = 1 \text{ to } J_n) \end{cases}$$

$$h(j) = -\infty \ (j = 1 \text{ to } J_n + 1).$$

Furthermore, let $TEMP1 = g(J_{W_u}+1)$, and $D_{MAX}$ be 0, and $TEMP2 = h(J_{W_u}+1)$ be $-\infty$, respectively.

(Step 2-4)

Let i be u.

(Step 2-5)

Repeat step 2-6 for "$j=J_{W_u}$ to 1".

(Step 2-6)

$TEMP3 = h(j)$
$h(j) = TEMP1 + 2 s_{W_u}(i, j)$

-continued $TEMP1 = g(j)$ $$g(j) = MAX \begin{cases} TEMP2 + s_{W_u}(i, j) \\ h(j) \\ TEMP3 + s_{W_u}(i, j) \end{cases}$$

$TEMP2 = h(j)$ (Step 2-7)

If $g(1)+D_{i-1}$ is smaller than $D_{MAX}$, go to step 2-8. If $D_{MAX}$ is equal to $g(1)+D_{i-1}$, $v_{max}=i$ is obtained.

(Step 2-8)

Let i be i+1. If i is equal to or greater than $u-2-J_{W_u}$, go to step 2-5.

(Step 2-9)

Since the boundary $v_{max}$ of the words is obtained, let x and u be x+1 and $v_{max}-1$, respectively. If u is greater than zero, go to step 2—2.

(Step 2-10)

If "Y=x−1" is given, $n_x(x=1$ to Y) as the recognized word string comprising Y words of the input pattern is concatenated in a reverse manner: "$n_y, n_{y-1}, \ldots, n_2, n_1$".

Note that TEMP1, TEMP2 and TEMP3 are the same as those used in step 1, that g(j), h(j) are the same as those used in step 1, and that $D_{MAX}$ is the memory section for the maximum value of relation (61).

The total computation $C_5$ in step 2 is given as follows, since the word in boundary search is known:

$$C_5 = 3J^2/4 \cdot Y \tag{64}$$

where Y is the number of words included in the input pattern A. "Y=4" as the mean value of the number Y of the words and "J=35" are substituted into relation (64):

$$C_5 = 3675 \tag{65}$$

The total computation $C_5$ in step 2 is smaller than 2% the total computation $C_4$ in step 1 which is given by relation (55). The total computation of the algorithm according to the present invention is approximately given by $C_4$.

As described above, when feature vectors $\alpha$ and $\beta$ are similar to each other, a maximum value is obtained as the similarity measure. However, a distance $|\alpha-\beta|$ is decreased if they are similar to each other. Therefore, if the distance is used, the maximum value is regarded as the minimum value, so that "$-\infty$" is replaced with "$+\infty$".

In the first step, the maximum similarity measure is obtained by the input pattern A and an optimal combination of the reference patterns. In the second step, utilizing the intermediate results $D_i$ and $W_i$ obtained in the first step, backtracking from the endpoint of the input pattern A is performed through a matching path obtained by the maximum similarity measure. Therefore, the continuous speech recognition device according to the present invention can determine the boundaries, order, and number of words in a concatenated word string.

II. Preferred Embodiments

FIG. 8 shows the overall arrangement of the continuous speech recognition device according to a first embodiment of the present invention. An utterance is entered through a microphone 101. An input speech signal is applied to a feature extracting unit 102. The frequency of the speech signal is analyzed by a Q-channel analyzing filter so as to time sample the output level of each channel. Thus, a feature vector $\alpha_i (= a_{1i}, a_{2i}, \ldots, a_{Qi})$ is produced. The feature vector is supplied to an input pattern buffer 103 so as to store the input pattern A for "i = 1 to I". The number I of vectors included in the input pattern A is determined in the feature extracting section 102. Reference numeral 104 denotes a reference pattern buffer for storing N reference patterns "$B^n (n = 1, 2, \ldots, N)$". The reference pattern $B^n (\not\equiv_1{}^n, \beta_2{}^n, \ldots, \beta_{J_n}{}^n)$ includes the Q-degree vector $\beta_j{}^n (b_1{}^n, b_{J_n}{}^n, \ldots, b_{Qj}{}^n)$ which comprises $J_N$ reference pattern lengths The feature vector $\alpha_i$ produced from the input pattern buffer 103 in response to a signal i and the feature vector $\beta_j{}^n$ produced from the reference pattern buffer 104 in response to signals j and n are supplied to a recursive computation section 105 (to be referred to as a DPM₁ 105 hereinafter) in which a similarity measure $s_n(i, j)$ between vectors is computed. With an initial value signal $D_{i-1}$, relation (51) is computed for "j = 1 to $J_n$". A similarity measure of each word for the input pattern A(1, i) is obtained as $g_n(i, J_n)$. The similarity measure $g_n(i, J_n)$ from the DPM₁ 105 is supplied to a first decision section 106 (to be referred to as a DCS₁ 106 hereinafter) which executes step 1-6. The similarity measure $g_n(i, J_n)$ is compared with a maximum similarity measure $D_i$ at a time point i. If the similarity measure $g_n(i, J_n)$ is greater than the maximum similarity measure $D_i$, the maximum similarity measure $D_i$ is modified to be the similarity measure $g_n(i, J_n)$. In this case, n is stored as $W_i$. Reference numeral 107 denotes a maximum similarity storage section (to be referred to as a D 107 hereinafter) which stores the maximum similarity measure $D_i$ with an endpoint of the time point i defined by relation (24). A maximum value produced by the DCS₁ 106 is stored in the D 107. A word number n which gives the maximum similarity measure $D_i$ produced from the DCS₁ 106 is written and stored in a terminal word memory 108 (to be referred to as a W 108 hereinafter).

Reference numeral 109 denotes a DPM₂ for computing a backtracked similarity measure $S(\overline{A}_{(u, v)}, \overline{B}^{W_u}) = g(v, 1)$. An output $g(v, 1)$ from the DPM₂ 109 and the $D_{v-1}$ from the D 107 are supplied to a DCS₂ 110 wherein a boundary point $v_{max}$ for maximizing the result of relation (61) is determined and produced thereby. The word number $W_u$ based on data $u = v_{max} - 1$ obtained by the boundary point $v_{max}$ is stored as $n_x (x = 1, 2, \ldots, X)$ in an order reversing section 111 (to be referred to as an REV 111 hereinafter). The REV 111 produces the words $\overline{n}_y (y = 1, 2, \ldots, Y)$ by reversing the time sequence. Reference numeral 112 denotes a control unit for controlling the overall operation. The control unit 112 produces various signals which control the feature extracting unit 102 to the REV 111 described above.

In the continuous speech recognition device with the above arrangement, in the speech signal entered through the microphone 101, an output from the Q-channel analyzing filter is sampled by a sampling signal t from the control unit 112 and is produced as the Q-degree vector $\alpha = (a_1, a_2, \ldots, a_Q)$. The feature extracting unit 102 supplies, to the control unit 112, a detection signal which represents the starting point and the endpoint of the utterance and the number I of vectors $\alpha$ from the beginning to the end. The input pattern buffer 103 stores the feature vector $\alpha_i$ from the feature extracting unit 102 in accordance with signals i ($= 1, 2, \ldots, I$) from the control unit 112. For descriptive convenience, assume that all input patterns are stored in the input pattern buffer 103. In the control unit 112, in accordance with step 1-1, intermediate result memory registers $g_n(j)$ and $h_n(j)$ in the DPM₁ 105 and the D 107 are initialized. The control unit 112 sequentially generates signals i (i = 1 to I). In response to each signal i, signals n are produced from 1 to N. In response to each signal n, signals j (j = 1 to $J_n$) are produced wherein $J_n$ is the pattern length of each word n.

The input pattern buffer 103 produces the feature vector $\alpha_i$ specified by the signal i from the control unit 112. The reference pattern buffer 104 produces the feature vector $\beta_j{}^n$ specified by the word selection signals n and j from the control 112. The DPM₁ 105 which receives output signals from these pattern buffers 103 and 104 updates $g_n(j)$ and $h_n(j)$ by the recursive computation of relation (51). The previous value of each word which is produced by the intermediate result memory register $g_n(j)$ or $h_n(j)$, and the similarity measure $s_n(i, j)$ between the feature vectors $\alpha_i$ and $\beta_j{}^n$, are used for updating, provided that the initial value of the recursive relation is defined as the maximum value $D_{i-1}$ at the previous unit time, that is, at (i − 1) produced by the D 107. When "j = $J_N$", the DCS₁ 106 compares the similarity measure $g_n(i, J_n)$ with the maximum similarity measure $D_i$ having that endpoint which corresponds to the time point i until the word (n − 1). If the similarity measure $g(i, J_n)$ is greater than the maximum similarity measure $D_i$, the similarity measure $g(i, J_n)$ is regarded as a maximum similarity measure. At this time, the word number n is stored as $W_i$ in the W 108. When the above processing is completed for n = 1, 2, . . . N, the number of the signals i is incremented by one. The incrementation is repeated for the number of times corresponding to the number I of the input patterns, that is, the incrementation is repeated for i = 1, 2, . . . , I, thereby obtaining all the intermediate results $D_i$ and $W_i$ for i = 1, 2, . . . , I.

When the above operation is completed, the control unit 112 produces u = 1 as the initial value. Thus, the recognized word signal $W_u$ is read out from the W 108. The control unit 112 initializes the intermediate result memories g(i) and h(j) in the DPM₂ 109 and a maximum value detecting register $D_{MAX}$ arranged in the DPM₂ to detect the maximum value of relation (61) in accordance with step 2-3. The number of signals v is decreased one by one from u to $(u - 2J_{W_u})$ by the control unit 112. Further, in response to each signal v, the number of signals j is decreased one by one from $J_{W_u}$ to 1.

A vector $\alpha_v$ is read out from the input pattern buffer 103 in response to the signal v. A vector $\beta_j{}^{W_u}$ is read out from the reference pattern buffer 104 in accordance with the signal j and the word signal $W_u$.

The DPM₂ 109 performs step 2-6 for "j = 1" using the intermediate result memory registers g(j) and h(j) and a similarity measure s(v, j) between vectors. When "j = 1", the DCS₂ 110 compares the previous maximum value $D_{MAX \ of \ "v = u \ to \ (v+1)"}$ with the sum of the output g(v, 1) from the DPM₂ 109 and the maximum similarity measure $D_{v-1}$ with the endpoint (v − 1). If the sum is greater than the maximum value $D_{MAX}$, the sum $\{D_{v-1} + g(v, 1)\}$ is stored as the maximum value, and the signal v is stored as $v_{max}$. The above processing until $v = u - 2 \cdot J_{wu}$. With the $v_{max}$ thus obtained, an output $u = v_{max} - 1$ is supplied to the control unit 112. The control unit 112 repeats the above operation until "u=0". The word signal $W_u$ sequentially obtained is stored in the REV 111 as $n_x$ (x=1, 2, ..., Y). When "u=0" is performed, the REV 111 produces the inverted output $n_y$ (y=1, 2, ..., Y) as "$\bar{n}_1 = \bar{n}_Y$, $\bar{n}_2 = n_{Y-1}$, ..., $\bar{n}_Y = n_1$".

In the above embodiment, speech recognition operation is started after the input pattern A is completely stored in the input pattern buffer 103. However, as shown in steps 1—1 to 1-8, when the input vector a is entered, steps 1-2 to 1-7 are simultaneously performed. The entire duration from the utterance input to the recognition result response can be used for the speech recognition processing, thus shortening the response time. Further, the DPM₁ 105 parallel processes data of words n at high speed. The DPM₁ 105 and the DPM₂ 109 perform the identical operation as shown in steps 1-5 and 2-6. Since the second step cannot be executed until the first step is completely finished, the second step may be performed in the DPM₁. Thus, the DPM₂ may be omitted.

The microphone 101 may be arbitrarily selected to be a telephone receiver or the like. Furthermore, in the above embodiment, all reference numerals 101 to 112 denote hardware. However, part or all of the processing performed by units 101 to 112 may be performed under program control. Further, the feature extraction unit 102 comprises a frequency analyzing filter. However, any unit can be used for extracting a parameter which represents the speech features such as linear prediction coefficient and a partial correlation coefficient. The similarity measure between the vectors may be represented by correlation, a distance, or the like.

Figure 9B:
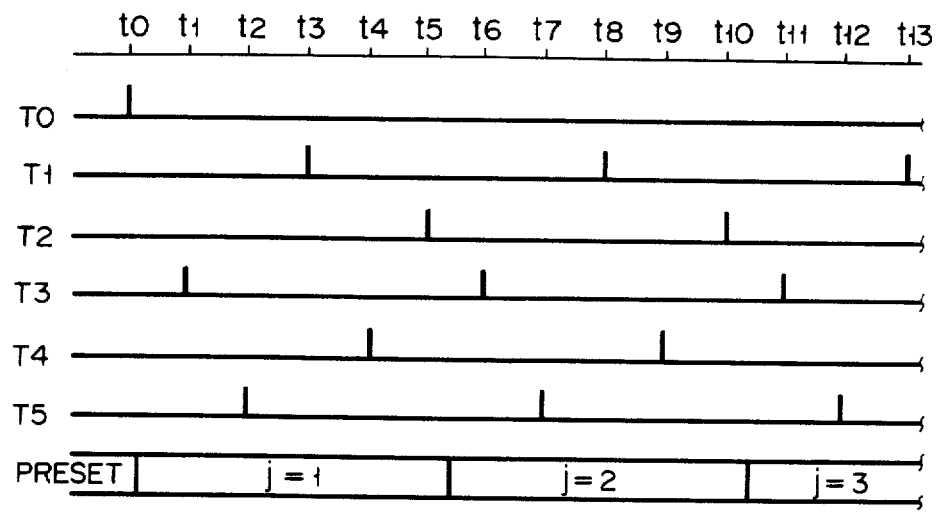
FIG. 9B is a timing chart of control signals of the DPM$_1$ of the device shown in FIG. 8.

The configuration of the DPM₁ 105 which is the principle part of the continuous speech recognition device of the first embodiment is shown in FIG. 9A. The configuration shown in FIG. 9A aims at calculating relation (51). Reference numeral 120 denotes a similarity measure operation unit for computing the similarity measure $s_n(i, j)$ between the vectors $a_i$ and $\beta_j{}^n$. Reference numeral 121 denotes a temporary memory register (to be referred to as a TEMP1 121 hereinafter) which receives $g_n(i-1, j)$ and produces $g_n(i-1, j-1)$. If computation is started with "j=1" in the TEMP1 121, $D_i$ is preset as the initial value. Reference numeral 122 denotes a temporary memory register (to be referred to as a TEMP2 122 hereinafter) which receives $h_n(i, j)$ and produces $h_n(i, j-1)$. If computation is started with "j=1", "$-\infty$" is preset as the initial value. Reference numeral 123 denotes a temporary memory register (to be referred to as a TEMP3 123 hereinafter) which temporarily stores $h_n(i-1, j)$.

The output $s_n(i, j)$ from the similarity measure operation unit 120 is supplied to a double multiplier circuit 124 which produces $2 \cdot s_n(i, j)$. The output $g_n(i-1, j-1)$ from the TEMP1 121 is added to the output $2 \cdot s_n(i, j)$ from the double multiplier 124 by an adder 125. The adder 125 produces an output $\{g_n(i-1, j-1) + 2 \cdot s_n(i, j)\}$, that is, $h_n(i, j)$. The output $h_n(i, j-1)$ from the TEMP2 122 and the output $s_n(i, j)$ from the similarity measure operation unit 120 are added by an adder 126. The adder 126 produces an output $\{h_n(i, j-1) + s_n(i, j)\}$. Furthermore, the output $h_n(i-1, j)$ from the TEMP3 123 is added to the output $s_n(i, j)$ from the similarity measure operation unit 120 by an adder 127. The adder 127 produces an output $\{h_n(i-1, j) + s_n(i, j)\}$. Reference numeral 128 denotes a maximum value detector (to be referred to as a MAX 128 hereinafter) which selects a maximum value among the output $h_n(i, j)$ from a memory 130 to be described later and outputs from the address 126 and 127. An output from the MAX 128 is supplied to a memory 129. The memory 129 stores data as follows:

$g_n(jj) = g_n(i, j)$ for $1 \leq jj \leq j$, and $g_n(jj) = g_n(i-1, j)$ for $j \leq jj \leq J_n$.

Data read out from the memory 129 is supplied to the TEMP1 121. The output $h_n(i, j)$ from the adder 125 is stored in the memory 130. The storage contents are as follows:

$h_n(jj) = h_n(i, j)$ for $1 \leq jj \leq j$, and $h_n(jj) = h_n(i-1, j)$ for $j \leq jj \leq J_n$.

Data read out from the memory 130 is supplied to the TEMP2 122 and to the MAX 128. Reference numeral 131 denotes a recursive control unit (to be referred to as a DPM 131 hereinafter) which controls the DPM₁ 105 and the DPM₂ 109. The DPM 131 supplies timing signals T1, T2, T3, T4 and T5 to the TEMP1 121, the TEMP2 122 and the TEMP3 123. Further, the timing signals T1, T2, T3, T4 and T5 are supplied to the memories 129 and 130 as write signals. The timing signals T1 to T5 are produced respectively for each signal j in the order shown in FIG. 9B. A timing signal T0 is a preset signal and is used to preset $D_i$ instead of $g_n(i-1, 0)$ in the TEMP1 121 and $-\infty$ instead of $h_n(i, 0)$ immediately before computation with "i=1" is started.

In the DPM₁ 105 with the above arrangement, the operation for the hatched region in FIG. 5B will be described. All the operations for every word number n are completed up to the time point "i=p" of the input pattern A. Therefore, $D_i$ is obtained for "$0 \leq i \leq p$". Further, the memory 129 stores data $g_n(p, j)$ (n=1, 2, ..., N; and j-32 1, 2, ..., $J_n$), and the memory 130 stores data $h_n(p, j)$ (n=1, 2, ..., N; and j=1, 2, ..., $J_n$).

An index j for taking out the vector $\beta_j{}^n$ of the word number n and the reference pattern $B^n$ is specified by the control unit 112 shown in FIG. 8. For performing the processing for the cross-hatched region in FIG. 5B, the TEMP1 121 and the TEMP2 122 are initially set by $D_p$ and $-\infty$, respectively at time t0 in response to the timing signal T0. In synchronism with the timing signal T3, the output $h_n(1)$, that is, $h_n(p, 1)$ from the memory 130 is written as "j=1" in the TEMP3 123 at time t1. A similarity measure $s_n(p+1, 1)$ between vectors $a_{p+1}$ and $\beta_1{}^n$ which are specified by "i=p+1" and "j=1" is computed by the similarity measure operation unit 120. The computed result is doubled by the double multiplier circuit 124 which then produces an output $2 \cdot s_n(p+1, 1)$. The output $2 \cdot s_n(p+1, 1)$ is added to the output $g_n(p, 0) = D_p$ from the TEMP1 121 by the adder 125. The adder 125 produces an output $h_n(p+1, 1)$ which is written in a register $h_n(1)$ of the memory 130 in synchronism with the timing signal T5 at time t2. At time t3, the output $g_n(1)$, that is, $g_n(p, 1)$ from the memory 129 is written in the TEMP1 121 in synchronism with the timing signal T1.

An output $h_n(p, 0) = -\infty$ from the TEMP2 122 is added to an output $s_n(p+1, 1)$ from the similarity measure operation unit 120 by the adder 126. An output $h_n(p, 1)$ from the TEMP3 123 and the output $s_n(p+1, 1)$ are added in the adder 127. The MAX 128 selects the maximum value among the outputs from the adders 126 and 127 and the memory 130:

$$h_n(1) = h_n(p+1, 1) = \{D_p + 2 \cdot s_n(p+1, 1)\} \tag{}$$

This maximum value is written as $g_n(1) = g_n(p+1, 1)$ in the memory 129 in synchronism with the timing signal T4 at time t4. At time t5, the output $h_n(1) = h_n(p+1, 1)$ from the memory 130 is written in synchronism with timing signal T2. Thus, the cycle of "j=1" is completed.

The next cycle is started by data "j=2" from the control unit 112. At time t6, an output $h_n(2)$, that is, $h_n(p, 2)$ from the memory 130 is written in the TEMP3 123. At time t7, the output $g_n(p, 1)$ from the TEMP1 121 and the output $2 \cdot s_n(p+1, 2)$ from the double multiplier circuit 124 is written as $h_n(2)$ in the memory 130. At time t8, $g_n(2) = g_n(p, 2)$ is then written in the memory 129. At time t9, the maximum value among the output $h_n(2) = h_n(p+1, 2)$ from the memory 130, the output $\{h_n(p+1, 1) + s_n(p+1, 2)\}$ from the adder 126, and the output $\{h_n(p, 2) + s_n(p+1, 2)\}$ from the adder 127 is written as $g_n(2) = g_n(p+1, 2)$ in the memory 129. At time t10, the output $h_n(2) = h_n(p+1, 2)$ from the memory 130 is written in the TEMP2 122. Thus, the cycle of "j=2" is completed. When the above cycle is repeated until $j = J_n$, the output $g_n(J_n)$ from the memory 129 becomes $g_n(p+1, J_n)$. This output is supplied to the $DSC_1$ 106 in FIG. 8.

The above processing is performed by relation (51) which is the modified relation (31). In addition to relation (51), there exists, for example, the following recursive relation with slope constraints:

$$g_n(i, j) = s_n(i, j) + \tag{70}$$

$$MAX \begin{cases} g_n(i-1, j-2) + 2 \cdot s_n(i, j-1) \\ g(i-1, j-1) + s_n(i, j) \\ g(i-3, j-2) + 2 \cdot s_n(i-2, j-1) + 2 \cdot s_n(i-1, j) \end{cases}$$

The slopes of relation (70) are $\frac{2}{3}$, 1, and 2, which indicates that the input pattern length may be changed with ±50% of the reference pattern length. The allowable pattern length range of relation (70) is narrower than that of relation (31) which has a range of −50% to +100% for slopes $\frac{1}{2}$, 1 and 2. In the same manner that relation (31) is modified to obtain relation (51), let $f_n(i, j)$ be defined as follows:

$$f_n(i, j) = g_n(i-2, j-2) + 2 \cdot s_n(i-1, j-1) + 2 \cdot s_n(i, j) \tag{71}$$
$$= h_n(i-1, j-1) + 2 \cdot s_n(i, j) \tag{72}$$

Relation (70) can be modified as follows:

$$g_n(i, j) = s_n(i, j) + MAX \begin{cases} h_n(i, j-1) \\ g_n(i-1, j-1) + s_n(i, j) \\ f_n(i-1, j) \end{cases} \tag{73}$$

$$g_n(i, j) = MAX \begin{cases} h_n(i, j-1) + s_n(i, j) \\ h_n(i, j) \\ f_n(i-1, j) + s_n(i, j) \end{cases} \tag{74}$$

Step 1 is thus modified as follows:

(Step 1'-1)

Let's define:

$D_0 = 0$
$D_i = -\infty$ for $i = 1$ to $I$ $\left. \begin{array}{l} g_n(j) = -\infty \\ h_n(j) = -\infty \\ f_n(j) = -\infty \end{array} \right\}$ for $n = 1$ to $N$ and $j = 1$ to $J_n$ Further, let i be 1.

(Step 1'-2)

Let n be 1.

(Step 1'-3)

Let's define:

$TEMP1 = D_{i-1} (= g_n(0))$ and $TEMP2 = -\infty (= h_n(0))$ (Step 1'-4)

Repeat step 1'-5 for $j = 1$ to $J_n$.

(Step 1'-5)

$TEMP3 = h_n(j)$
$h_n(j) = TEMP1 + 2 \cdot s_n(i, j)$
$TEMP1 = g_n(j)$ $g_n(j) = MAX \begin{cases} TEMP2 + s_n(i, j) \\ h_n(j) \\ f_n(j) + s_n(i, j) \end{cases}$ $TEMP2 = h_n(j)$
$f_n(j) = TEMP3 + 2 \cdot s_n(i, j)$ (Step 1'-6)

If $g_n(J_n)$ is smaller than $D_i$, go to step 1'-7. If not, let $D_i$ and $W_i$ be $g_n(J_n)$ and n, respectively.

(Step 1'-7)

Let n be n+1. If n is equal to or smallter than N, go to step 1'-3.

(Step 1'-8)

Let i be i+1. If i is equal to or smaller than I, go to step 1'-2.

The above program sequence is performed by the circuit shown in FIG. 10. The circuit is operated at the same timings as in FIG. 9B. The reference numerals used in FIG. 9B denote the same parts in FIG. 10, and a detailed description thereof will be omitted.

Examples of recursive relations without slope constraints are as follows:

$$g_n(i, j) = s_n(i, j) + \mathrm{MAX} \begin{cases} g_n(i-1, j) \\ g_n(i-1, j-1) \\ g_n(i, j-1) \end{cases}$$

Or $$g_n(i, j) = s_n(i, j) + \mathrm{MAX} \begin{cases} g_n(i-1, j) \\ g_n(i-1, j-1) \\ g_n(i-1, j-2) \end{cases}$$

The second example is described in Japanese Patent Disclosure No. 51-104204. Since neither recursive relation has a slope constraint, an aligning window as bounded by lines 11 and 12 shown in FIG. 1 is required for avoiding the abrupt alignment of the time bases.

In both above recursive relations, the abrupt alignment occurs locally. According to experiments in speech recognition, unsatisfactory results have been reported.

Figure 11:
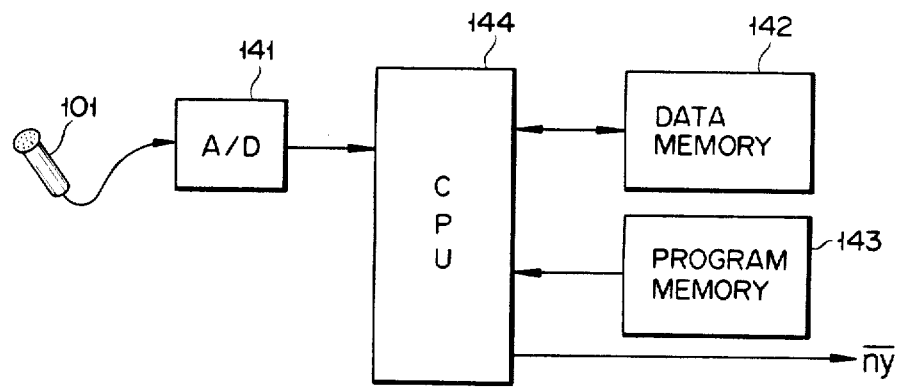
FIG. 11 is a block diagram of a continuous speech recognition device according to a second embodiment of the present invention

FIG. 11 shows a continuous speech recognition device according to a second embodiment of the present invention. An utterance entered as an analog speech signal through a microphone 101 is converted to a digital signal in an A/D converter 141. Reference numeral 142 denotes a data memory for storing data of the input pattern A, the reference pattern B, the intermediate results $g_n(j)$, $h_n(j)$, $g(j)$ and $h(j)$, the maximum similarity measure $D_i$, and the terminal word $W_i$. Reference numeral 143 denotes a program memory. The speech signal converted to a digital signal is coupled to a CPU 144. The program from the program memory 143 is executed in the CPU 144.

In order to describe the above processing in detail, the speech signal entered from the microphone 101 is converted to a digital signal by the A/D converter 141. The digital signal is fetched in the CPU 144 with a predetermined time interval, for example, 100 µsec. and is then stored in the data memory 142. When 150 digital signals are written in the data memory 142, the CPU 144 performs fast Fourier transform (FFT) to obtain the power spectrum which is multiplied by 16 triangular windows. Thus, the same result as in a 16-channel frequency analyzing bandpass filter are obtained. The result is defined as the input vector α. One hundred and fifty pieces of data are obtained every 15 msec. The time interval of 15 msec. is defined as one frame.

The mode of operation of the CPU 144 by the program stored in the program memory 143 will be described with reference to flowchart in FIGS. 12 to 15.

A variable $i_1$ used in the flowcharts is an index representing an address for storing the vector α computed in the interrupt processing. A variable l is a counter for counting low-power frames for detecting a terminal end in an interrupt loop. A variable $I_1$ indicates the number of vectors α from the starting point to the endpoint. A variable $i_2$ is an index for reading out the input vector α in the speech recognition processing. In the low-power frame during the continuous word pattern, process 2 (corresponding to step 1) is not performed, and the flow advances. A variable $i_3$ is an index for reading out the input vector α for executing process 2. $D_i$, $g_n(j)$, $h_n(j)$, $W_i$, $g(j)$ and $h(j)$ are data stored in the data memory 142; $D_i$ is the maximum similarity measure with the ith frame as an endpoint; $g_n(j)$ and $h_n(j)$ are registers for intermediate results of the recursive relation for the word having the word number n in process 2; $W_i$ is the terminal word of the word string for giving the maximum similarity measure $D_i$; and $g(j)$ and $h(j)$ are registers for storing the intermediate results of the recursive relation in process 3 (corresponding to step 2). A variable j is an index for reading out the vector $\beta_j$ of the reference pattern. A variable n indicates a word number. A constant $J_n$ indicates a time duration (the number of frames) of the word having the word number n. A constant N is the number of reference patterns. Variable TEMP1, TEMP2 and TEMP3 are temporary memory registers of the DPM$_1$ 105. A variable u is an index for providing a starting point of a partial pattern of the reverse pattern matching in process 3. A variable v is an index for providing an endpoint of the partial pattern of the reverse pattern matching. $D_{MAX}$ is a register for storing a detected maximum value given by relation (61). $v_{max}$ is a register for storing the index v which gives $D_{MAX}$. A variable x is an index for storing a recognized word number $n_x$. $s_n(i, j)$ is the similarity measure between the vectors $\alpha_i$ and $\beta_j^n$. Symbol $-\infty$ indicates the maximum negative value obtained in the CPU 144.

Figure 12A:
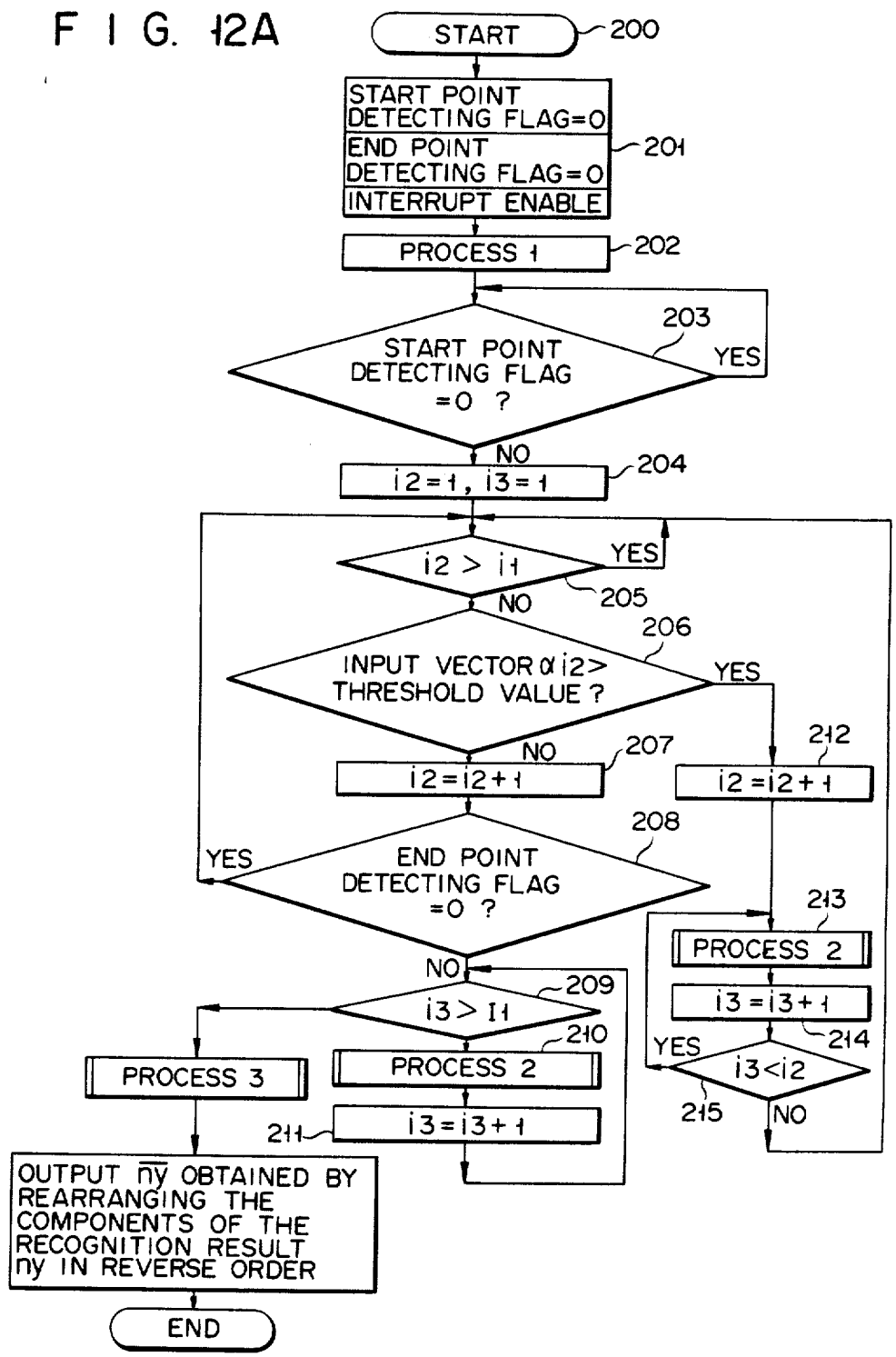
FIGS. 12A and 12B are flowcharts for explaining the mode of operation of the continuous speech recognition device of the second embodiment.

The main program starts with start step 200 as shown in FIG. 12A. In step 201, a flag is initially set to be low so as to indicate detection of the starting point and endpoint of the utterance. Thus, the interrupt from the A/D converter 141 is enabled every 100 µsec. In the following steps, the interrupt processing for data fetching, computation of the feature vector α, and detection of the starting point and the endpoint are performed in parallel with the speech recognition processing.

Figure 12B:
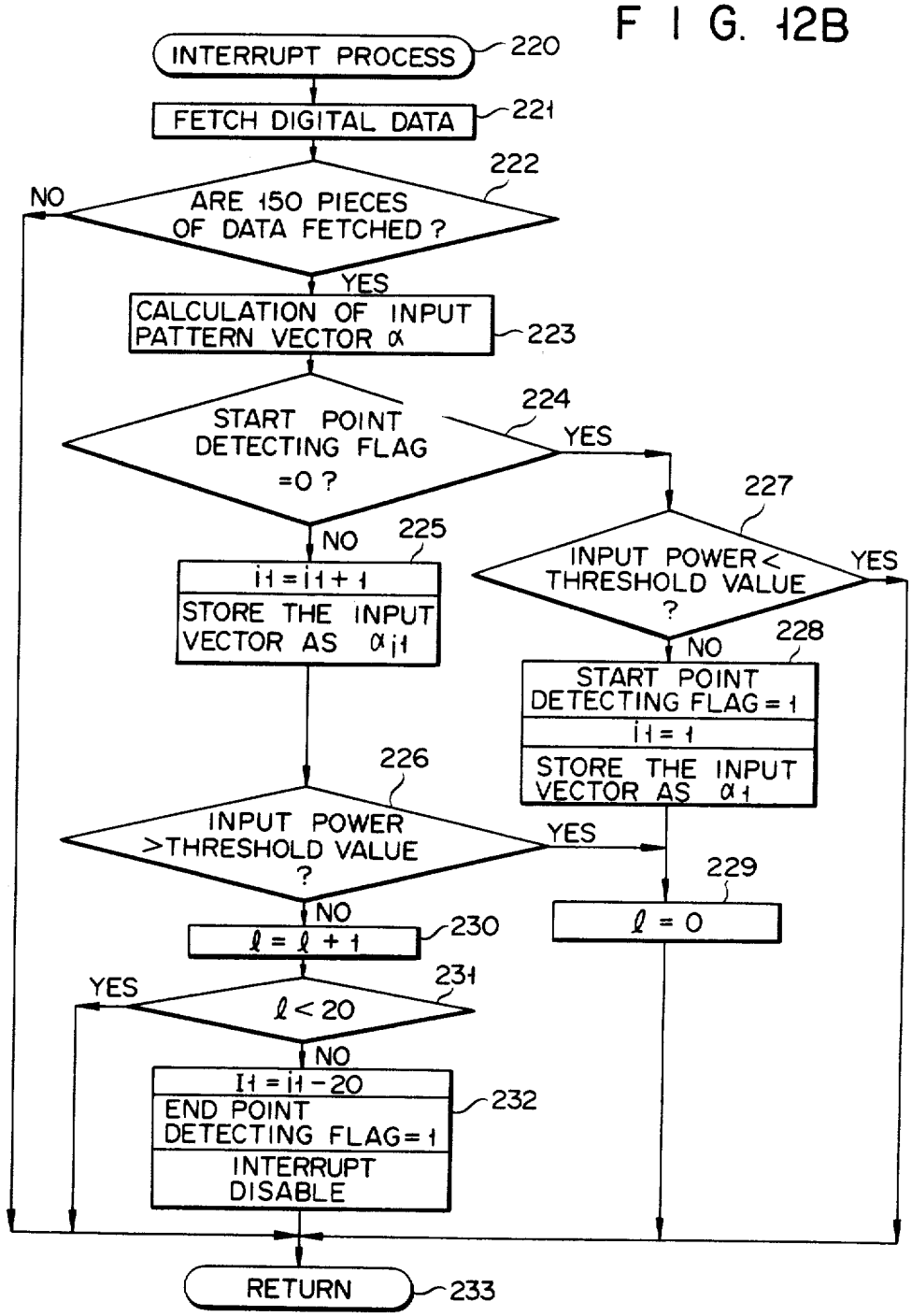
Figure 13:
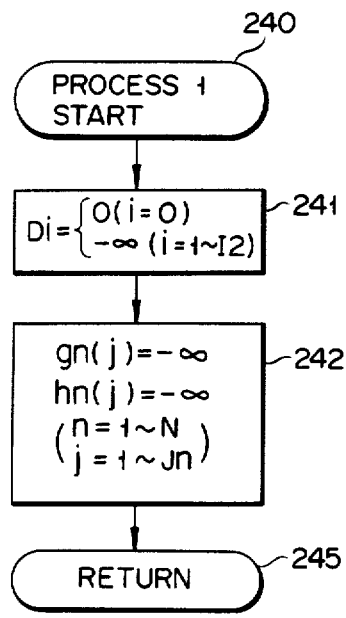
FIG. 13 is a flowchart for explaining Process 1 in FIG. 12A.

Interrupt processing steps 220 to 233 are first described with reference to FIG. 12B. When the interrupt occurs, interrupt process step 220 is initiated. In step 221, digital data from the A/D converter 141 is stored in the data memory 142. It is determined in step 222 whether or not the number of data has reached 150. If NO in step 222, the interrupt process is terminated in return step 223. When 150 pieces of data are written in the CPU 144, the computation of the vector α is performed in step 223. It is then checked in step 224 if the starting point detection flag is set to logical level "0". If YES in step 224, it is determined in step 127 whether or not the sum of powers (e.g., the sum $$\sum_{}^{16} \alpha$$

of the elements of the vector α) is higher than a threshold value. If NO in step 227, the interrupt process is interrupted in step return step 233. However, if YES in step 227, it is determined that the starting point is detected. In step 228, the starting point flag is set to logical level "1" and the index $i_1$ is set to logical level "1"; vector $\alpha_{i1}$ is defined as $\alpha_1$ and is stored in the input pattern buffer A. In step 229, the counter l is set to logical level "0", so that in return step 223 the interrupt process is interrupted.

Meanwhile, when the starting point detecting flag is set to logical level "1" in step 224, the index $i_1$ is increased by one in step 225 and is defined as the input vector $\alpha_{i1}$ and is stored in the input pattern buffer A. In decision step 226, if the power of the input vector is higher than the threshold value, the flow advances to step 229. Otherwise, the input vector is regarded as a low-power frame, and the counter l is increased by one.

In step 231 which represents a decision box, it is checked whether or not the count of the counter l has reached 20, that is, 20 low-power frames have been continuously counted. If NO in step 231, the flow advances to return step 223. Otherwise, it is determined that the input utterance is completed, so that in step 232 the number of effective vectors α from the starting point to the endpoint is defined as $I_1$, and the endpoint detecting flag is set to logical level "1". An interrupt from the A/D converter 141 is prohibited, and in step 233 the interrupt process is interrupted.

By the above interrupt process, the vectors α are fetched in the input pattern buffer A every 15 msec.

The steps after step 202 in the main program will be described below. In process 1 (steps 240 to 245 in FIG. 13) in step 202, initialization corresponding to step 1—1 is performed.

In decision step 203, it is waited until the starting point detecting flag is set to logical level "1". When the flag is set to logical level "1", a speech input is regarded as started. In step 204, the indexes $i_2$ and $i_3$ are initialized to be logical level "1". In decision step 205, indexes $i_1$ and $i_2$ which are used for the interrupt process are compared. If the index $i_2$ is equal to or smaller than $i_1$, the flow advances to step 206 which represents a decision box. If the power of the vectors $α_{i_2}$ is smaller than the threshold value, $i_2$ is regarded as a low-power frame during the speech input. In step 207, the index $i_2$ is increased by 1. Subsequently, in decision step 208, the logical status of the endpoint detecting flag is checked. If the flag is set to logical level "0", the endpoint is regarded as not being detected. Then, the flow returns to step 205.

However, in step 206, if the power of the vectors is higher than the threshold value, the flow advances to step 212 in which the index $i_2$ is increased by one. Process 2 which corresponds to steps 1-2 to 1-7 is performed in step 213. In step 214, the index $i_3$ is increased by one. In step 215, the indexes $i_3$ and $i_2$ are compared. If the index $i_3$ is smaller than the index $i_2$, the flow returns to step 213 and process 2 is continued. However, if the index $i_3$ is equal to or greater than the index $i_2$, the flow returns to step 205.

If the endpoint detecting flag is set to logical level "1" in step 208, the indexes $i_3$ and $i_2$ are compared in step 209. If process 2 in step 213 is not completed within 15 msec., fetching of vectors α may be performed prior to completion thereof. Therefore, if the endpoint is detected, an unevaluated input vector α may be present in the CPU 144. Thus, the indexes $i_3$ and $i_2$ are compared. If the index $i_3$ is equal to or smaller than the number $I_1$ of input vectors, the same operation as in steps 213 and 214 is performed in steps 210 and 211. However, in step 209, if it is determined that the index $i_3$ is greater than $I_1$, all the input vectors are regarded as evaluated, and process 3 (correspond to step 2) in step 216 is then performed to obtain the recognized word string $n_x$. In step 217, the order of the word string $n_x$ is reversed to obtain the reversed word string $\bar{n}_y$. Thus, the continuous speech recognition process is completed.

Figure 14:
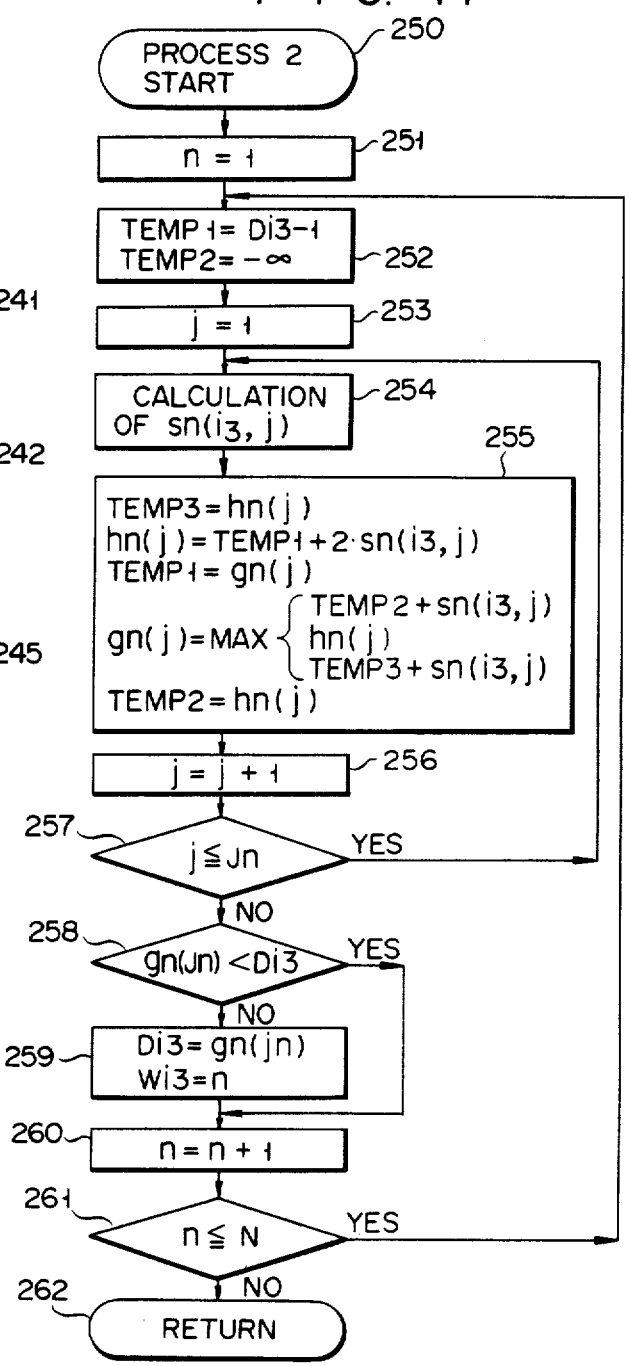
FIG. 14 is a flowchart for explaining Process 2 in FIG. 12A.

The detail of process 2 is illustrated in FIG. 14. Step 251 corresponds to step 1-2; step 252 corresponds to step 1-3; steps 253, 256 and 257 corresponds to step 1-4; steps 254 and 255 correspond to step 1-5; steps 258 and 259 correspond to step 1-6; and step 261 corresponds to step 1-7.

Figure 15:
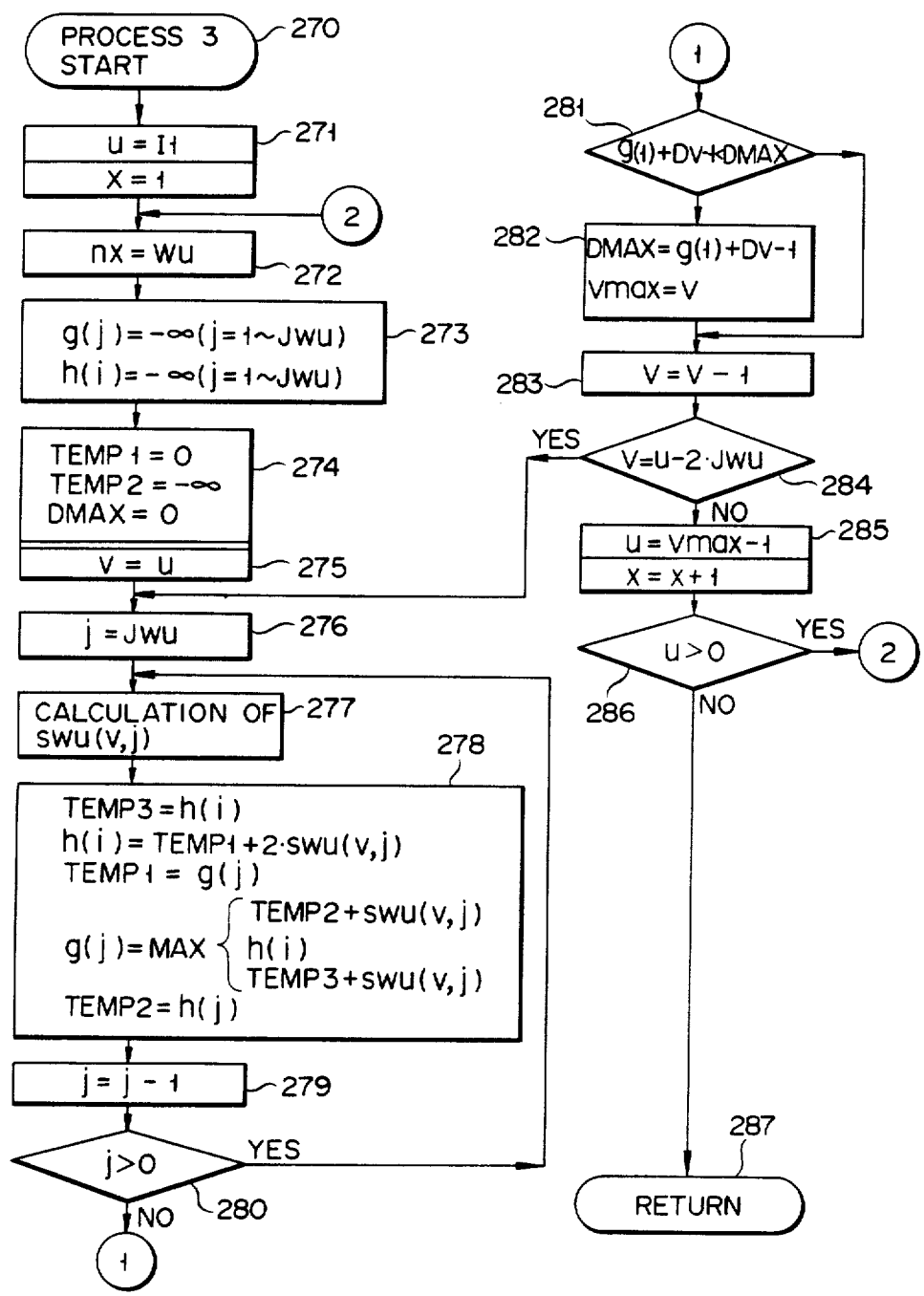
FIG. 15 is a flowchart for explaining Process 3 in FIG. 12A.

FIG. 15 shows the detail of process 3. Step 271 corresponds to step 2-1; step 272 corresponds to step 2-2; steps 273 and 274 corresponds to step 2-3; and step 275 correspond to step 2-4. Symbol i used in the second step is replaced with v in the flowchart in FIG. 15. Steps 276, 279 and 280 correspond to step 2-5; steps 277 and 278 correspond to the recursive computation in step 2-6; steps 281 and 282 corresponds to the maximum value detection in step 2-7; steps 283 and 284 corresponds to step 2-8; step 285 corresponds to step 2-9; and step 286 corresponds to step 2-10.

In the second embodiment, process 3 in step 216 which corresponds to step 2 is performed such that the endpoint is detected when 20 low-power frames are continuously counted. However, the detection may be performed simultaneously when the first low-power frame is detected. If an effective power frame is entered before the endpoint is detected, the results by process 3 become invalid. With the above arrangement, the result $\bar{n}_x$ (or $\bar{n}_y$) is known when the endpoint is detected, thus requiring shorter response time.

According to the experimental results of the continuous speech recognition process according to the continuous speech recognition device of the present invention, for a total of 160 numbers (40 numbers for each 2 to 5 digits), 96.3% of numerals were recognized. For a total of 560 words (each digit of the number being defined as one word), 99.2% of words were recognized. The above figures correspond to the result in which 99.5% of 1000 separately occurring discrete words were recognized. Thus, the continuous speech recognition means according to the present invention is very effective.

It is understood from the above description that the following advantages are provided according to the continuous speech recognition device of the present invention;

(1) In order to obtain the maximum similarity measure $D_q$ between the partial pattern $A(1, q)$ (of the input pattern A) which has as its starting point "i=1" and as its endpoint "i=q", and a suitable combination of the reference patterns, the partial pattern $A(1, q)$ is divided into sub-partial patterns $A(1, p)$ and $A(p+1, q)$. The maximum similarity measure $D_p$ of $A(1, p)$ is added to the similarity measure $S(A_{p+1, q}, B^n)$ obtained by matching between $A(p+1, q)$ and the reference pattern $B^n$. The maximum value of the sum with respect to p is obtained by the dynamic programming algorithm. Further, a means for determining the maximum value $D_q$ with respect to n only once performs the computation of the similarity measure $s(α_i, β_j^n)$ between vectors with respect to a combination of i, j and n. Therefore, the number of total computations in the algorithm of the present invention is about 1/25 the number in the conventional algorithm.

(2) When one input vector $α_q$ ($1 \leq q \leq I$) is entered, all the words with word number n (1 to N) and time bases j (1 to $J_n$) of each word can be computed to obtain all the $D_q$ and $W_q$, so that 98% of the total computation in the first step is parallel processed upon entry of the speech input. Therefore, the time duration from utterance to recognition response can be effectively used.

(3) According to the table of the maximum similarity measure $D_i$ and the end word $W_i$ ($1 \leq i \leq I$) which are obtained in the first step, the endpoint (i=I) of the input pattern is defined as the first boundary. For these words determined only by the boundaries, backtracking is performed. Therefore, the boundary of the immediately previous word can be readily obtained by the dynamic programming algorithm.

(4) In the dynamic programming algorithm in which the boundary is obtained in the second step, since one of the two words at the boundary (endpoint of the input pattern) is determined, the total amount of computations is very small.

(5) Since it is possible to complete computation of the first step at the same time as the utterance is completed, and since the total number of computations in the second step is as small as 2% of that in the first step, response can be made as a whole at the same time as the utterance is completed.

(6) In the pattern matching device having intermediate result memory registers $g_n(J)$, $h_n(j)$ and so on and TEMP1, TEMP2 and TEMP3, the total memory area is small as indicated by relation (52) or (54) compared with the case in which part or all of $g_n(i, j)$ and $s_n(i, j)$ are stored as indicated by relation (47) or (48). Pattern matching can be readily performed with hardware.

(7) Since the amount of data processing of the algorithm of the present invention is 1/25 that of the conventional algorithm, low-speed elements can be used, resulting in low lost.

(8) If the same elements used in the conventional device are used for the device of the present invention, the number of reference patterns can be increased by 25 times. Therefore, the type of recognized words can be increased.

(9) Since the memory area of the device of the present invention is half of that of the conventional device, the device as a whole is low in cost and small in size.

(10) Although parallel processing can be considered for high speed processing, the device of the present invention can perform the total computation during the time taken for one vector input in the conventional device, the total number of computations being $\{(2^*r+1)^*N\}$, and the total memory area being $\{(2^*r+1)^2*N*2+M_1\}$. Further, if this device is used for parallel processing, the total number of computations is 1/25 that of the conventional device, and the total memory area is about 1/17 that of the conventional device.

(11) The number Q of degrees of the feature vector, and the number of vectors of the input and reference patterns per unit time are generally increased to improve speech recognition. If the algorithm of the present invention is applied to the conventional device, and if the number of recognized words and the response time are the same as in the conventional case, the product of the number of vectors per unit time and the number Q of degrees of the vector can be increased by 25 times. Thus, higher recognition efficiency can be expected.

(12) Since a recursive relation with a two-side slope constraint is used, no abrupt adjustment of the time bases occurs even if the dynamic programing algorithm is simultaneously performed for the plurality of starting points and endpoints. Thus, the total amount of computations is greatly decreased.

(13) The maximum similarity measure $D_p$, between the partial pattern $A(1, p)$ of the input pattern having as endpoint p the immediately previous frame of each starting point $(p+1)$ and a combination of proper reference patterns, is used as an initial point of each of a plurality of starting points. A combination of reference patterns which optimally approximates the partial pattern $A(1, q)$ having a given endpoint q is obtained by, summation of the initial value $D_p$ with similarity measures $S(A_{(p+1, q)}, B^n)$ of the partial pattern $A(p+1, q)$ and each reference pattern $B^n$. Thus, continuous speech recognition can be performed with a substantially same amount of processing as in the case of discrete word recognition.

What we claim is:

1. A machine method for recognizing continuous speech comprising the steps of:

converting input speech to an input pattern $A = (\alpha 1, \alpha 2, \ldots, \alpha i, \ldots, \alpha I)$ as a time sequence of a feature vector $\alpha i$ representing a feature of said input speech at a time point i ($1 \leq i \leq I$); and recognizing a series of words most similar to said input speech by the use of dynamic programming between said input pattern A and a plurality of reference pattern $B^n$ preset as $B^n = (\beta_1^n, \beta_2^n, \ldots, \beta_j^n, \ldots, \beta_{jn}^n)$ with respect to a word number n($1 \leq n \leq N$), said recognizing step obtaining maximum similarity measures Di and words Wi sequentially for i=1 through i=I by repeatedly maximizing a sum $Dp + S(A(p+1, q), B^n)$ from q=1 through q=I with respect to a boundary $P(1 \leq P \leq I)$ by the use of a dynamic programming for each word number n, said sum including a maximum similarity measure Dp between a partial pattern $A(1, P) = (\alpha 1, \alpha 2, \ldots, \alpha p$ having as an end point a time point i=p of said input pattern A and an optimum combination Bp of said reference patterns $B^n$ between the time points i=1 and i=p, said maximum similarity measure Dp being defined as Dp=0 for P=0 and Dp=S(A(1, P), Bp) for P=1 through P=I, and a maximum value $S(A(p+1, q), B^n)$ of a sum of similarity measures $s(\alpha i, \beta_j^n)$ between said vectors $\alpha i$ and $\beta_j^n$, said similarity measures $s(\alpha i, \beta_j^n)$ being defined between the time axis i and a function j(i) which most optimally correlates the time axis i of a partial pattern $A(p+1, q) = (\alpha p+1, \alpha p+2, \ldots, \alpha i, \ldots, \alpha)$ of said input pattern A having a starting point i=P+1 and the end point i=q to the time axis j of said reference patterns $B^n$, and to obtain a maximum similarity measure Dq defined as $$Dq = \underset{p,n}{MAX}(Dp + S(A(p + 1, q), B^n))$$

which gives the maximum value of the maximized sum $$\underset{p}{MAX}(Dp + S(A(p + 1, q), B^n))$$

with respect to the word number n and a word Wq which corresponds to the word number n giving the maximum similarity measure Dq.

2. A machine method according to claim 1 wherein said recognizing step also includes subsequent steps of:

repeatedly obtaining a similarity measure $S(\overline{A}(u, v), \overline{B}^{wu})$ by giving u=Vmax−1 between a reversed partial pattern $\overline{A}(u, v)$ and a reversed reference pattern $\overline{B}^{wu}$ by the use of a dynamic programming, said reversed partial pattern $\overline{A}(u, v)$ being a time sequentially reversed pattern of a partial pattern $A(u, V)$ having as a starting point u the time point i=I of said input pattern A to use said word Wi at the time point i=I as a recognized word Wu and an end point $V(I \geq u > V \geq 1)$ and said reversed reference pattern $\overline{B}^{wu}$ being a time sequentially reversed pattern of said reference pattern $B^{wu}$; and determining a boundary v as Vmax which maximizes a sum of said similarity measure $S(\overline{A}(u, V), \overline{B}^{wu})$ and said similarity measure Dv−1 at a time point $i=v=1$, and reverses the order of recognized words Wu which are sequentially obtained at the time point u.

3. A machine method according to claim 1 or 2 wherein said sum $Dp+S(A(1+p, q), B^n)$, with respect to the boundary P for each word number n, is obtained by calculating a similarity measure $s(\alpha q, \beta_j^n)$ between vectors $\alpha q$ and $\beta_j^n$ at the time point $i=q$ and determining a similarity measure $g_n(q, j)$ which gives the optimum path from the starting point $i=1$ to the end point $i=q$ by the use of a predetermined gradual equation defined by said similarity measure $S(\alpha q, \beta_j^n)$ (and a plurality of path information to a point (q, j), ) said determination of the similarity measure $g_n(q, j)$ being repeated from $j=1$ to $j=Jn$ so that the similarity measure $g_n(q, Jn)$ is used as said sum $Dp+S(A(1+p, q), B^n)$.

4. A machine method according to claim 3 wherein said gradual equation $g_n(q, j)$ is defined as $$g_n(q, j) = MAX \begin{bmatrix} h_n(q, j-1)+s(\alpha q, \beta_j^n) \\ h_n(q, j) \\ h_n(q-1, j)+s(\alpha q, \beta_j^n) \end{bmatrix}$$

in which $h_n(q, j)$ is used as the path information at the time point $i=q$ and defined as $h_n(q, j)=g_n(q-1, j-1)+2s(\alpha q, \beta_j^n)$.

5. A machine method according to claim 3 wherein said gradual equation $g_n(q, j)$ is defined as $$g_n(q, j) = MAX \begin{bmatrix} h_n(q, j-1)+s(\alpha q, \beta_j^n) \\ h_n(q, j) \\ f_n(q-1, j)+s(\alpha q, \beta_j^n) \end{bmatrix}$$

in which $h_n(q, j)$ and $f_n(q, j)$ are used as the path information at the time point $i=q$ and defined as $h_n(q, j)=g_n(q-1, j-1)+2s(\alpha i, \beta_j^n)$ and $f_n(g, j)=h_n(q-1, j-1)+2s(\alpha i, \beta_j^n)$.

6. An apparatus for recognizing a continuous speech comprising:

input means for converting input speech to an input pattern $A=(\alpha 1, \alpha 2, \ldots, \alpha i, \ldots, \alpha I)$ as a time sequence of a feature vector $\alpha i$ representing a feature of said input speech at a time point i ($1 \leq i \leq I$);

reference means for memorizing a plurality of reference pattens preset as $B^n = (\beta_1^n, \beta_2^n, \ldots, \beta_j^n, \ldots \beta_{J_n}^n)$ with respect to a word number $n(1 \leq n \leq N)$; and recognition means for recognizing a series of words most similar to said input speech by the use of dynamic programming between said input pattern A and said reference patterns $B^n$, said recognition means including:

maximum similarity measure memory means for memorizing for each $q(1 \leq q \leq I)$ a maximum similarity measure Dq between a partial pattern $A(1, q)=(\alpha 1, \alpha 2, \ldots, \alpha q)$ having as starting and end points time points $i=1$ and $i=q$, respectively, of said input pattern A and an optimum combination of said reference patterns $B^n$ between the time points $i=i$ and $i=q$, word memory means for memorizing for each q a word Wq corresponding to the last one of said optimum combination of said reference patterns $B^n$ which gives said maximum similarity measure Dq, pattern matching means for maximizing with respect to a boundary P, by the use of dynamic programming, a sum of a maximum similarity measure Dp and a maximum value $S(A(P+1, q), B^n)$ of a sum of similarity measure $s(\alpha i, \beta_j^n)$ between said vectors $\alpha i$ and $\beta_j^n$, said similarity measure $s(\alpha i, \beta_j^n)$ being defined between the time axis i and a function j(i) which most optimumly correlates the time axis i of a partial pattern $A(P+1, q)=(\alpha p+1, \alpha p+2, \ldots, \alpha i, \ldots \alpha q)$ of said input pattern A having a starting point $i=P+1(1 \leq P+1 < q \leq I)$ and the end point $i=q$ to the time axis j of said reference patterns $B^n$, and decision means for deciding, with respect to a word number n, said maximum similarity measure Dq as $$Dq = \underset{p,n}{MAX}(Dp+(A(P+1, q), B^n)$$

which gives the maximum value of said maximized sum $$\underset{P}{MAX}(Dp + S(A(p + 1, q), B^n)$$

maximized by said pattern matching means and said word Wq which corresponds to the word number n giving said maximum similarity measure Dq so that said maximum similarity measure Dq and said word Wq are memorized by said maximum similarity measure memory means and said word memory means, respectively.

7. An apparatus according to claim 6 wherein said recognition means further includes:

another decision means for repeatedly deciding, by giving $u=Vmax-1$, a similarity measure $S(\overline{A}(u, v), \overline{B}^{wu})$ between a reversed partial pattern $\overline{A}(u, v)$ and a reversed reference pattern $\overline{B}^{wu}$ by the use of a dynamic programming and a boundary v as Vmax which maximizes a sum of said similarity measure $S(\overline{A}(u, v), \overline{B}^{wu})$ and the similarity measure $Dv-1$ at a time point $i=v-1$, said reversed partial pattern $\overline{A}(u, v)$ being a time sequentially reversed pattern of a partial pattern $A(u, v)$ having as a starting point u the time point $i=I$ of said input pattern A to use said word Wi at the time point $i=I$ as a recognized word Wu and an end point $v(I \geq u \geq 1)$ and said reversed reference pattern $\overline{B}^{wu}$ being a time sequentially reversed pattern of said reference pattern $B^{wu}$; and order reversing means for reversing the order of said words Wu decided by said second decision means.

8. An apparatus according to claim 6 or 7 wherein said pattern matching means includes:

similarity measure calculation means for calculating a similarity measure $s(\alpha q, \beta_j^n)$ between vectors $\alpha$ and $\beta_j^n$ at the time point $i=q$; and gradual equation calculation means for calculating a similarity measure $g_n(q, j)$ which gives the optimum path from the starting point $i=1$ to the end point $i=q$ by the use of a predetermined gradual equation defined by said similarity measure $s(\alpha q, \beta_j^n)$ and a plurality of path information to a point (q, j), said calculation of the similarity measure $g_n(q, j)$ being repeated from $j=1$ to $j=jn$ so that the similarity measure $g_n(q, Jn)$ is used as said sum $Dp+S(A(1+p, q), B^n)$.

9. An apparatus according to claim 8 wherein said gradual equation calculation means includes:

path information means for providing the path information $h_n(q, j-1)$, $h_n(q, j)$ and $h_n(q-1, j)$ defined as $h_n(i, j) = g_n(i-1, j-1) + 2s(\alpha q, \beta_j^n)$ for the time point i; and a gradual equation execution means for executing said gradual equation $g_n(q, j)$ defined as $$g_n(q, j) = \text{MAX} \begin{bmatrix} h_n(q, j-1) + s(\alpha q, \beta_j^n) \\ h_n(q, j) \\ h_n(q-1, j) + s(\alpha q, \beta_j^n) \end{bmatrix}.$$

10. An apparatus according to claim 8 wherein said gradual equation calculation means includes:

path information means for providing the path information $h_n(q, j-1)$, $h_n(q, j)$ and $f_n(q-1, j)$ defined as $h_n(i, j) = g_n(i-1, j-1) + 2s(\alpha i, \beta_j^n)$ and $f_n(i, j) = h_n(i-1, j-1) + 2s(\alpha i, \beta_j^n)$ for the time point i, respectively; and a gradual equation execution means for executing said gradual equation $g_n(q, j)$ defined as $$g_n(q, j) = \text{MAX} \begin{bmatrix} h_n(q, j-1) + s(\alpha q, \beta_j^n) \\ h_n(q, j) \\ f_n(q-1, j) + s(\alpha q, \beta_j^n) \end{bmatrix}.$$

* * * * *